(12) United States Patent
Kuwamoto et al.

(10) Patent No.: US 9,610,941 B2
(45) Date of Patent: Apr. 4, 2017

(54) DRIVE CONTROL DEVICE FOR HYBRID VEHICLE

(75) Inventors: Hiroki Kuwamoto, Toyota (JP); Yoshiteru Hagino, Nisshin (JP); Tomohito Ono, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/385,657

(22) PCT Filed: Mar. 21, 2012

(86) PCT No.: PCT/JP2012/057154
§ 371 (c)(1),
(2), (4) Date: Sep. 16, 2014

(87) PCT Pub. No.: WO2013/140541
PCT Pub. Date: Sep. 26, 2013

(65) Prior Publication Data
US 2015/0046008 A1 Feb. 12, 2015

(51) Int. Cl.
*B60L 11/02* (2006.01)
*B60K 6/20* (2007.10)
(Continued)

(52) U.S. Cl.
CPC ............ *B60W 20/50* (2013.01); *B60K 6/445* (2013.01); *B60K 6/48* (2013.01); *B60W 10/08* (2013.01);
(Continued)

(58) Field of Classification Search
None
See application file for complete search history.

(56) References Cited

U.S. PATENT DOCUMENTS

| 6,317,665 | B1 | 11/2001 | Tabata et al. |
| 7,057,304 | B2 * | 6/2006 | Ueda ............... B60K 6/445 180/65.1 |

(Continued)

FOREIGN PATENT DOCUMENTS

| JP | 2000120858 A | 4/2000 |
| JP | 2004159412 A | 6/2004 |

(Continued)

OTHER PUBLICATIONS

Communication from the United States and Trademark Office issued Feb. 26, 2016 in U.S. Appl. No. 14/386,661.

*Primary Examiner* — Thomas G Black
*Assistant Examiner* — Demetra Smith-Stewart
(74) *Attorney, Agent, or Firm* — Sughrue Mion, PLLC

(57) ABSTRACT

A drive control device for a hybrid vehicle is provided with a differential device including four rotary elements; and an engine, first and second electric motors and an output rotary member which are respectively connected to the four rotary elements. One of the four rotary elements is constituted by a rotary component of a first differential mechanism and a rotary component of a second differential mechanism selectively connected through a clutch, and one of the rotary components is selectively fixed to a stationary member through a brake. The hybrid vehicle is selectively placed in a plurality of drive modes according to respective combinations of engaged and released states of the clutch and the brake. The drive control device comprises: a substitutive drive control portion configured to alternately implement a vehicle driving control and a battery charging control in the event of a failure of one of the first and second electric motors, the vehicle driving control being implemented to operate the other of the first and second electric motors, for generating a vehicle drive force, and the battery charging (Continued)

control being implemented to charge a vehicle driving battery with the other electric motor.

9 Claims, 14 Drawing Sheets

(51) Int. Cl.
| | | |
|---|---|---|
| *B60L 3/04* | (2006.01) | |
| *B60W 10/08* | (2006.01) | |
| *B60W 10/06* | (2006.01) | |
| *B60W 20/00* | (2016.01) | |
| *B60K 1/02* | (2006.01) | |
| *B60W 20/50* | (2016.01) | |
| *B60K 6/445* | (2007.10) | |
| *B60K 6/48* | (2007.10) | |
| *B60W 10/26* | (2006.01) | |
| *B60W 50/029* | (2012.01) | |
| *B60W 50/14* | (2012.01) | |
| *B60K 6/38* | (2007.10) | |

(52) U.S. Cl.
CPC .......... *B60W 10/26* (2013.01); *B60W 50/029* (2013.01); *B60W 50/14* (2013.01); *B60K 1/02* (2013.01); *B60K 2006/381* (2013.01); *B60L 3/04* (2013.01); *B60W 20/00* (2013.01); *Y02T 10/6221* (2013.01); *Y02T 10/6239* (2013.01); *Y10S 903/93* (2013.01)

(56) References Cited

U.S. PATENT DOCUMENTS

| | | | |
|---|---|---|---|
| 7,117,965 B2 * | 10/2006 | Yatabe | .................. B60K 6/445 |
| | | | 180/65.235 |
| 8,435,147 B2 * | 5/2013 | Kim | ....................... B60K 6/365 |
| | | | 475/280 |
| 9,005,078 B2 | 4/2015 | Hayashi et al. | |
| 9,020,678 B2 | 4/2015 | Nakajima | |
| 2004/0084234 A1 | 5/2004 | Yatabe et al. | |
| 2005/0184529 A1 | 8/2005 | Ueda | |
| 2007/0254776 A1 * | 11/2007 | Wakashiro | ............... B60K 6/48 |
| | | | 477/181 |
| 2010/0116235 A1 | 5/2010 | Imamura et al. | |
| 2011/0111906 A1 | 5/2011 | Kim et al. | |
| 2011/0111909 A1 | 5/2011 | Kim et al. | |
| 2011/0251747 A1 | 10/2011 | Imai et al. | |
| 2013/0072336 A1 * | 3/2013 | G V | ........................ F16H 3/728 |
| | | | 475/5 |
| 2014/0194238 A1 * | 7/2014 | Ono | ........................ B60K 6/445 |
| | | | 475/5 |
| 2015/0005125 A1 | 1/2015 | Hayashi et al. | |
| 2015/0057861 A1 | 2/2015 | Nakajima | |
| 2015/0088350 A1 | 3/2015 | Tamachi et al. | |

FOREIGN PATENT DOCUMENTS

| | | |
|---|---|---|
| JP | 2005-199942 A | 7/2005 |
| JP | 2005304229 A | 10/2005 |
| JP | 2006-320068 A | 11/2006 |
| JP | 4038183 B2 | 1/2008 |
| JP | 2008-265600 A | 11/2008 |
| JP | 2009126486 A | 6/2009 |
| JP | 2009126487 A | 6/2009 |
| JP | 2010115982 A | 5/2010 |
| WO | 2013/014777 A1 | 1/2013 |

* cited by examiner

|  | BK | CL | MODE |
|---|---|---|---|
| EV-1 | O |  | 1 |
| EV-2 | O | O | 2 |
| HV-1 | O |  | 3 |
| HV-2 |  | O | 4 |
| HV-3 |  |  | 5 |

DRIVE CONTROL DEVICE FOR HYBRID VEHICLE

CROSS REFERENCE TO RELATED APPLICATIONS

This application is a National Stage of International Application No. PCT/JP2012/057154 filed Mar. 21, 2012, the contents of all of which are incorporated herein by reference in their entirety.

TECHNICAL FIELD

The present invention relates to an improvement of a drive control device for a hybrid vehicle.

BACKGROUND ART

There is known a hybrid vehicle which has at least one electric motor in addition to an engine such as an internal combustion engine, which functions as a vehicle drive power source. Patent Document 1 discloses an example of such a hybrid vehicle, which is provided with an internal combustion engine, a first electric motor and a second electric motor. This hybrid vehicle is further provided with a brake which is configured to fix an output shaft of the above-described internal combustion engine to a stationary member, and an operating state of which is controlled according to a running condition of the hybrid vehicle, so as to improve energy efficiency of the hybrid vehicle and to permit the hybrid vehicle to run according to a requirement by an operator of the hybrid vehicle.

PRIOR ART DOCUMENT

Patent Document

Patent Document 1: JP-2008-265600 A1
Patent Document 2: JP-4038183 B2

SUMMARY OF THE INVENTION

Object Achieved by the Invention

According to the conventional arrangement of the hybrid vehicle described above, however, the hybrid vehicle is placed in a substitutive drive mode in the event of a failure of the second electric motor. In the substitutive drive mode, the first electric motor is operated with a torque received directly from the engine to charge a vehicle driving battery. However, this substitutive drive mode has a drawback that the engine cannot be operated with a high output, due to limitation of an electric energy amount that can be stored in the vehicle driving battery, and sufficient drive force may not be obtained. In the event of a failure of the first electric motor, on the other hand, the vehicle driving battery cannot be charged with the first electric motor, and the hybrid vehicle cannot be run in an adequate substitutive drive mode, particularly where the electric energy amount stored in the vehicle driving battery is not sufficient. These problems were first discovered by the present inventors in the process of intensive studies in an attempt to improve the performance of the hybrid vehicle.

The present invention was made in view of the background art described above. It is therefore an object of the present invention to provide a drive control device for a hybrid vehicle, which permits the hybrid vehicle to be run in an adequate substitutive drive mode in the event of failure of an electric motor.

Means for Achieving the Object

The object indicated above is achieved according to a first aspect of the present invention, which provides a drive control device for a hybrid vehicle provided with: a first differential mechanism and a second differential mechanism which have four rotary elements as a whole; and an engine, a first electric motor, a second electric motor and an output rotary member which are respectively connected to the above-described four rotary elements, and wherein one of the above-described four rotary elements is constituted by the rotary element of the above-described first differential mechanism and the rotary element of the above-described second differential mechanism which are selectively connected to each other through a clutch, and one of the rotary elements of the above-described first and second differential mechanisms which are selectively connected to each other through the above-described clutch is selectively fixed to a stationary member through a brake, the above-described hybrid vehicle being selectively placed in a plurality of drive modes according to respective combinations of engaged and released states of the above-described clutch and the above-described brake, the drive control device being characterized by alternately implementing a vehicle driving control and a battery charging control in the event of a failure of one of the above-described first and second electric motors, the above-described vehicle driving control being implemented to operate the other of the first and second electric motors, for generating a vehicle drive force, and the above-described battery charging control being implemented to charge a vehicle driving battery, with the above-described other electric motor.

Advantages of the Invention

According to the first aspect of the invention described above, the hybrid vehicle is provided with: the first differential mechanism and the second differential mechanism which have the four rotary elements as a whole; and the engine, the first electric motor, the second electric motor and the output rotary member which are respectively connected to the four rotary elements. One of the above-described four rotary elements is constituted by the rotary element of the above-described first differential mechanism and the rotary element of the above-described second differential mechanism which are selectively connected to each other through the clutch, and one of the rotary elements of the above-described first and second differential mechanisms which are selectively connected to each other through the clutch is selectively fixed to the stationary member through the brake. The hybrid vehicle is selectively placed in a plurality of drive modes according to respective combinations of the engaged and released states of the above-described clutch and the above-described brake. The drive control device is configured to alternately implement the vehicle driving control and the battery charging control in the event of a failure of one of the above-described first and second electric motors, the above-described vehicle driving control being implemented to operate the other of the first and second electric motors, for generating the vehicle drive force, and the above-described battery charging control being implemented to charge the vehicle driving battery with the above-described other electric motor. Accordingly, not only the hybrid vehicle can be run with a sufficient drive force, but also the vehicle driving battery can be charged with a sufficient amount of electric energy even in the event of a failure of one of the first and second electric motors. Namely, the present invention provides a drive control device for a hybrid vehicle, which permits the hybrid vehicle to be run in an adequate substitutive drive mode in the event of a failure of an electric motor.

According to a second aspect of the invention, the drive control device according to the first aspect of the invention is configured to switch the above-described vehicle driving control and the above-described battery charging control from one to the other, depending upon an amount of electric energy stored in the above-described vehicle driving battery. According to this second aspect of the invention, the vehicle driving control to generate the vehicle drive force with the above-indicated other electric motor, and the battery charging control to charge the vehicle driving battery with this other electric motor can be switched from one to the other in a highly practical manner.

According to a third aspect of the invention, the drive control device according to the second aspect of the invention is configured to implement the above-described battery charging control with the above-described engine and the above-described second electric motor in the engaged state of the above-described clutch and in the released state of the above-described brake, where an electric energy amount stored in the above-described vehicle driving battery is smaller than a predetermined threshold value, in the event of the failure of the above-described first electric motor. According to this third aspect of the invention, the vehicle driving battery can be suitably charged in a highly practical manner where the electric energy amount stored in the vehicle driving battery is insufficient in the event of the failure of the above-described first electric motor.

According to a fourth aspect of the invention, the drive control device according to the second aspect of the invention is configured to implement the above-described vehicle driving control to operate the above-described second electric motor to generate the vehicle drive force in the engaged state of the above-described brake, where an electric energy amount stored in the above-described vehicle driving battery is equal to or larger than a predetermined threshold value, in the event of the failure of the above-described first electric motor. According to this fourth aspect of the invention, a sufficient vehicle drive force can be obtained in a highly practical manner in the substitutive drive mode in the event of the failure of the above-described first electric motor.

According to a fifth aspect of the invention, the drive control device according to the second aspect of the invention is configured to implement the above-described battery charging control with the above-described engine and the above-described first electric motor, where an electric energy amount stored in the above-described vehicle driving battery is smaller than a predetermined threshold value, in the event of the failure of the above-described second electric motor. According to this fifth aspect of the invention, the vehicle driving battery can be suitably charged in a highly practical manner where the electric energy amount stored in the vehicle driving battery is insufficient in the event of the failure of the above-described second electric motor.

According to a sixth aspect of the invention, the drive control device according to the second aspect of the invention is configured to implement the above-described vehicle driving control to operate the above-described first electric motor to generate the vehicle drive force in the engaged states of both of the above-described clutch and the above-described brake, where an electric energy amount stored in the above-described vehicle driving battery is equal to or larger than a predetermined threshold value, in the event of the failure of the above-described second electric motor. According to this sixth aspect of the invention, a sufficient vehicle drive force can be obtained in a highly practical manner in the substitutive drive mode in the event of the failure of the above-described second electric motor.

According to a seventh aspect of the invention, the drive control device according to any one of the first, second, third, fourth, fifth and sixth aspects of the invention is configured to command an indicator device disposed within a compartment of the hybrid vehicle to provide instructional information relating to the above-described vehicle driving control and the above-described battery charging control, in the event of the failure of the above-described first electric motor or the above-described second electric motor. According to this seventh aspect of the invention, an operator of the hybrid vehicle is provided with adequate instructions as to a manner of manipulation of the hybrid vehicle that should be conducted by the operator in the event of the failure of the first or second electric motor.

According to an eighth aspect of the invention, the drive control device according to the seventh aspect of the invention according to any one of the first, second, third, fourth, fifth and sixth aspects of the invention is configured to command the above-described indicator device to provide the instructional information prompting an operator of the hybrid vehicle to stop the hybrid vehicle and park the hybrid vehicle in a turnout until the charging of said battery is completed, when the above-described battery charging control is implemented to charge the battery. According to this eighth aspect of the invention, the operator of the hybrid vehicle is provided with adequate instructions as to a manner of manipulation of the hybrid vehicle that should be conducted by the operator when the electric energy amount stored in the vehicle driving battery is insufficient, in the event of the failure of the first or second electric motor.

According to a ninth aspect of the invention, the drive control device according to the seventh aspect of the invention according to any one of the first, second, third, fourth, fifth and sixth aspects of the invention is configured to command the above-described indicator device to provide the instructional information indicating that the hybrid vehicle can be run, when the above-described vehicle driving control is implemented. According to this ninth aspect of the invention, the operator of the hybrid vehicle is provided with adequate instructions indicating that the vehicle can be run in an adequate substitutive drive mode, in the event of a failure of the first or second electric motor.

According to a tenth aspect of the invention, the drive control device according to any one of the first, second, third, fourth, fifth and sixth aspects of the invention, or according to the seventh aspect of the invention according to any one of the first, second, third, fourth, fifth and sixth aspects of the invention, or according to the eighth aspect of the invention according to the seventh aspect of the invention according to any one of the first, second, third, fourth, fifth and sixth aspects of the invention, or according to the ninth aspect of the invention according to the seventh aspect of the invention according to the first, second, third, fourth, fifth and sixth aspects of the invention is configured such that the above-described first differential mechanism is provided with a first rotary element connected to the above-described first electric motor, a second rotary element connected to the above-described engine, and a third rotary element connected to the above-described output rotary member, while the above-described second differential mechanism is provided with a first rotary element connected to the above-described second electric motor, a second rotary element, and a third rotary element, one of the second and third rotary elements being connected to the third rotary element of the above-described first differential mechanism, and the above-described clutch is configured to selectively connect the second rotary element of the above-described first differential mechanism, and the other of the second and third rotary elements of the above-described second differential mechanism which is not connected to the third rotary element of the above-described first differential mechanism, to each other, while the above-described brake is configured to selectively fix the other of the second and third rotary elements of the above-described second differential mechanism which is not connected to the third rotary element of the above-described first differential mechanism, to a stationary member. According to this tenth aspect of the invention, the hybrid vehicle can be run in an adequate substitutive drive mode in the event of a failure of an electric motor in the drive system of the hybrid vehicle, which has a highly practical arrangement.

MODE FOR CARRYING OUT THE INVENTION

Figure 1:
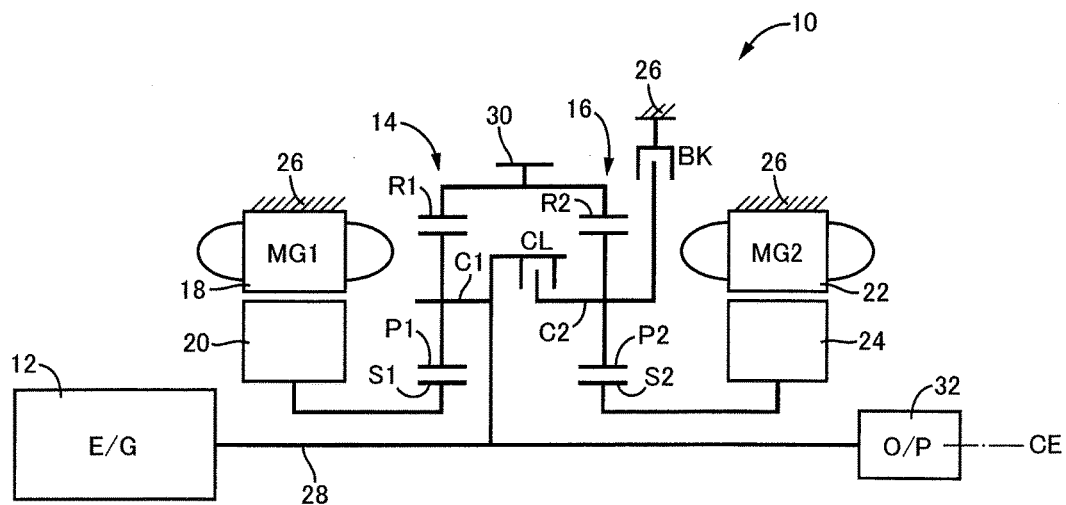
FIG. 1 is a schematic view for explaining an arrangement of a hybrid vehicle drive system to which the present invention is suitably applicable.

According to the present invention, the first and second differential mechanisms as a whole have four rotary elements while the above-described clutch is placed in the engaged state. In one preferred form of the present invention, the first and second differential mechanisms as a whole have four rotary elements while a plurality of clutches, each of which is provided between the rotary elements of the first and second differential mechanisms and which includes the above-described clutch, are placed in their engaged states. In other words, the present invention is suitably applicable to a drive control device for a hybrid vehicle which is provided with the first and second differential mechanisms represented as the four rotary elements indicated in a collinear chart, the engine, the first electric motor, the second electric motor and the output rotary member coupled to the respective four rotary elements, and wherein one of the four rotary elements is selectively connected through the above-described clutch to another of the rotary elements of the first differential mechanism and another of the rotary elements of the second differential mechanism, while the rotary element of the first or second differential mechanism to be selectively connected to the above-indicated one rotary element through the clutch is selectively fixed through the above-described brake to the stationary member.

In another preferred form of the present invention, the above-described clutch and brake are hydraulically operated coupling devices operating states (engaged and released states) of which are controlled according to a hydraulic pressure. While wet multiple-disc type frictional coupling devices are preferably used as the clutch and brake, meshing type coupling devices, namely, so-called dog clutches (claw clutches) may also be used. Alternatively, the clutch and brake may be electromagnetic clutches, magnetic powder clutches and any other clutches the operating states of which are controlled (which are engaged and released) according to electric commands.

The drive system to which the present invention is applicable is placed in a selected one of a plurality of drive modes, depending upon the operating states of the above-described clutch and brake. Preferably, EV drive modes in which at least one of the above-described first and second electric motors is used as a vehicle drive power source with the engine stopped include a mode 1 to be established in the engaged state of the brake and in the released state of the clutch, and a mode 2 to be established in the engaged states of both of the clutch and brake. Further, hybrid drive modes in which the above-described engine is operated while the above-described first and second electric motors are operated to generate a vehicle drive force and/or an electric energy as needed, include a mode 3 to be established in the engaged state of the brake and in the released state of the clutch, a mode 4 to be established in the released state of the brake and the engaged state of the clutch, and a mode 5 to be established in the released states of both of the brake and clutch.

In a further preferred form of the invention, the rotary elements of the above-described first differential mechanism, and the rotary elements of the above-described second differential mechanism are arranged as seen in the collinear charts, in the engaged state of the above-described clutch and in the released state of the above-described brake, in the order of the first rotary element of the first differential mechanism, the first rotary element of the second differential mechanism, the second rotary element of the first differential mechanism, the second rotary element of the second differential mechanism, the third rotary element of the first differential mechanism, and the third rotary element of the second differential mechanism, where the rotating speeds of the second rotary elements and the third rotary elements of the first and second differential mechanisms are indicated in mutually overlapping states in the collinear charts.

Referring to the drawings, preferred embodiments of the present invention will be described in detail. It is to be understood that the drawings referred to below do not necessarily accurately represent ratios of dimensions of various elements.

First Embodiment

FIG. 1 is the schematic view for explaining an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common center axis CE. The drive system 10 is constructed substantially symmetrically with respect to the center axis CE. In FIG. 1, a lower half of the drive system 10 is not shown. This description applies to other embodiments which will be described.

The engine 12 is an internal combustion engine such as a gasoline engine, which is operable to generate a drive force by combustion of a fuel such as a gasoline injected into its cylinders. Each of the first electric motor MG1 and second electric motor MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio $\rho 1$ and which is provided with rotary elements (elements) consisting of a first rotary element in the form of a sun gear S1; a second rotary element in the form of a carrier C1 supporting a pinion gear P1 such that the pinion gear P1 is rotatable about its axis and the axis of the planetary gear set; and a third rotary element in the form of a ring gear R1 meshing with the sun gear S1 through the pinion gear P1. The second planetary gear set 16 is a single-pinion type planetary gear set which has a gear ratio $\rho 2$ and which is provided with rotary elements (elements) consisting of: a first rotary element in the form of a sun gear S2; a second rotary element in the form of a carrier C2 supporting a pinion gear P2 such that the pinion gear P2 is rotatable about its axis and the axis of the planetary gear set; and a third rotary element in the form of a ring gear R2 meshing with the sun gear S2 through the pinion gear P2.

The sun gear S1 of the first planetary gear set 14 is connected to the rotor 20 of the first electric motor MG1. The carrier C1 of the first planetary gear set 14 is connected to an input shaft 28 which is rotated integrally with a crankshaft of the engine 12. This input shaft 28 is rotated about the center axis CE. In the following description, the direction of extension of this center axis CE will be referred to as an "axial direction", unless otherwise specified. The ring gear R1 of the first planetary gear set 14 is connected to an output rotary member in the form of an output gear 30, and to the ring gear R2 of the second planetary gear set 16. The sun gear S2 of the second planetary gear set 16 is connected to the rotor 24 of the second electric motor MG2.

The drive force received by the output gear 30 is transmitted to a pair of left and right drive wheels (not shown) through a differential gear device not shown and axles not shown. On the other hand, a torque received by the drive wheels from a roadway surface on which the vehicle is running is transmitted (input) to the output gear 30 through the differential gear device and axles, and to the drive system 10. A mechanical oil pump 32, which is a vane pump, for instance, is connected to one of opposite end portions of the input shaft 28, which one end portion is remote from the engine 12. The oil pump 32 is operated by the engine 12, to generate a hydraulic pressure to be applied to a hydraulic control unit 60, etc. which will be described. An electrically operated oil pump which is operated with an electric energy may be provided in addition to the oil pump 32.

Between the carrier C1 of the first planetary gear set 14 and the carrier C2 of the second planetary gear set 16, there is disposed a clutch CL which is configured to selectively couple these carriers C1 and C2 to each other (to selectively connect the carriers C1 and C2 to each other or disconnect the carriers C1 and C2 from each other). Between the carrier C2 of the second planetary gear set 16 and the stationary member in the form of the housing 26, there is disposed a brake BK which is configured to selectively couple (fix) the carrier C2 to the housing 26. Each of these clutch CL and brake BK is a hydraulically operated coupling device the operating state of which is controlled (which is engaged and released) according to the hydraulic pressure applied thereto from the hydraulic control unit 60. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from an electronic control device 40.

As shown in FIG. 1, the drive system 10 is configured such that the first planetary gear set 14 and second planetary gear set 16 are disposed coaxially with the input shaft 28 (disposed on the center axis CE), and opposed to each other in the axial direction of the center axis CE. Namely, the first planetary gear set 14 is disposed on one side of the second planetary gear set 16 on a side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16 which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16 are interposed between the first electric motor MG1 and second electric motor MG2. That is, the drive system 10 is configured such that the first electric motor MG1, first planetary gear set 14, clutch CL, second planetary gear set 16, brake BK and second electric motor MG2 are disposed coaxially with each other, in the order of description from the side of the engine 12, in the axial direction of the center axis CE.

Figure 2:
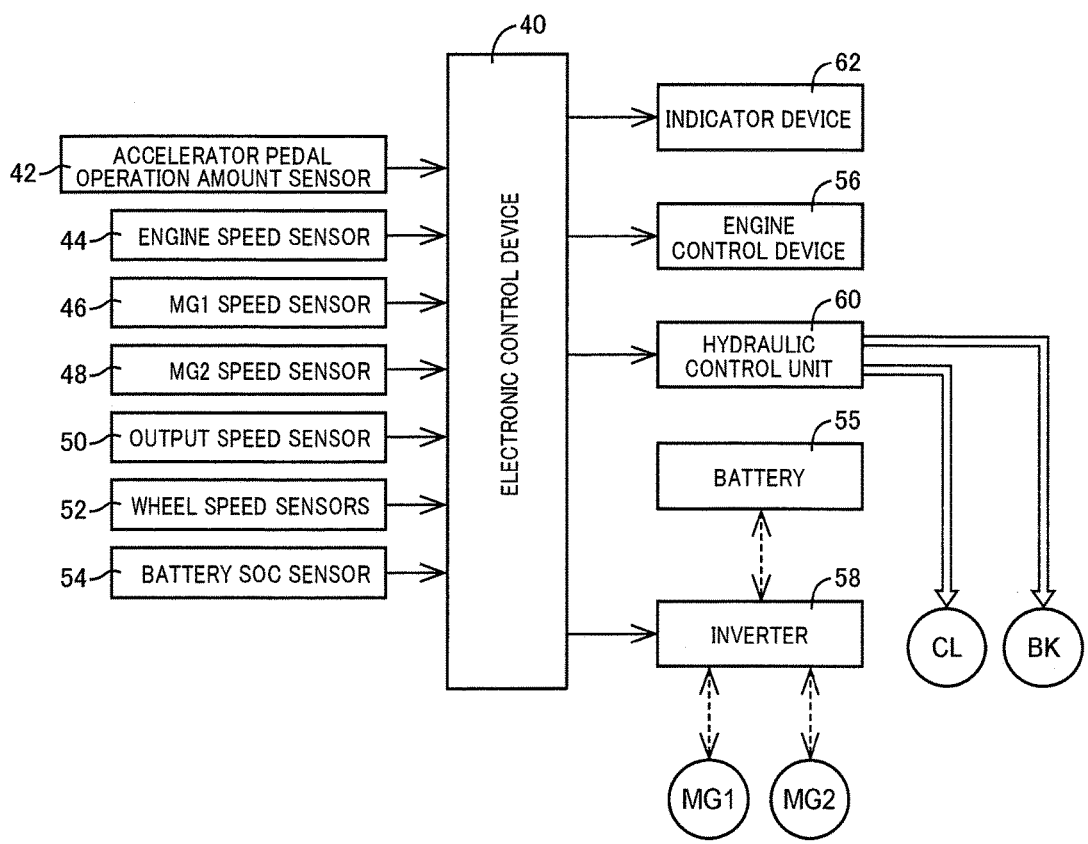
FIG. 2 is a view for explaining major portions of a control system provided to control the drive system of FIG. 1.

FIG. 2 is the view for explaining major portions of a control system provided to control the drive system 10. The electronic control device 40 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first electric motor MG1 and second electric motor MG2. In the present embodiment, the electronic control device 40 corresponds to a drive control device for a hybrid vehicle having the drive system 10. The electronic control device 40 may be constituted by mutually independent control units as needed for respective controls such as an output control of the engine 12 and drive controls of the first electric motor MG1 and second electric motor MG2.

As indicated in FIG. 2, the electronic control device 40 is configured to receive various signals from sensors and switches provided in the drive system 10. Namely, the electronic control device 40 receives: an output signal of an accelerator pedal operation amount sensor 42 indicative of an operation amount or angle $A_{CC}$ of an accelerator pedal (not shown), which corresponds to a vehicle output required by a vehicle operator; an output signal of an engine speed sensor 44 indicative of an engine speed $N_E$, that is, an operating speed of the engine 12; an output signal of an MG1 speed sensor 46 indicative of an operating speed $N_{MG1}$ of the first electric motor MG1; an output signal of an MG2 speed sensor 48 indicative of an operating speed $N_{MG2}$ of the second electric motor MG2; an output signal of an output speed sensor 50 indicative of a rotating speed $N_{OUT}$ of the output gear 30, which corresponds to a running speed V of the vehicle; an output signal of wheel speed sensors 52 indicative of rotating speeds $N_W$ of wheels in the drive system 10; and an output signal of a battery SOC sensor 54 indicative of a stored electric energy amount (state of charge) SOC of a battery 55.

The electronic control device 40 is also configured to generate various control commands to be applied to various portions of the drive system 10. Namely, the electronic control device 40 applies to an engine control device 56 for controlling an output of the engine 12, following engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 40 applies command signals to an inverter 58, for controlling operations of the first electric motor MG1 and second electric motor MG2, so that the first and second electric motors MG1 and MG2 are operated with electric energies supplied thereto from the battery 55 through the inverter 58 according to the command signals to control outputs (output torques) of the electric motors MG1 and MG2. Electric energies generated by the first and second electric motors MG1 and MG2 are supplied to and stored in the battery 55 through the inverter 58. That is, the battery 55 corresponds to a vehicle driving battery in the drive system 10. Further, the electronic control device 40 applies command signals for controlling the operating states of the clutch CL and brake BK, to linear solenoid valves and other electromagnetic control valves provided in the hydraulic control unit 60, so that hydraulic pressures generated by those electromagnetic control valves are controlled to control the operating states of the clutch CL and brake BK. The electronic control device 40 applies display control signals to a display device in the form of an indicator device 62 disposed near an operator's seat within a compartment of the hybrid vehicle, so that the indicator device 62 indicates various kinds of information on the hybrid vehicle, such as the vehicle running speed V, the engine speed $N_E$ and any other running states of the hybrid vehicle, the electric energy amount stored in the battery 55, and the presently established vehicle drive mode.

An operating state of the drive system 10 is controlled through the first electric motor MG1 and second electric motor MG2, such that the drive system 10 functions as an electrically controlled differential portion whose difference of input and output speeds is controllable. For example, an electric energy generated by the first electric motor MG1 is supplied to the battery or the second electric motor MG2 through the inverter 58. Namely, a major portion of the drive force of the engine 12 is mechanically transmitted to the output gear 30, while the remaining portion of the drive force is consumed by the first electric motor MG1 operating as the electric generator, and converted into the electric energy, which is supplied to the second electric motor MG2 through the inverter 58, so that the second electric motor MG2 is operated to generate a drive force to be transmitted to the output gear 30. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
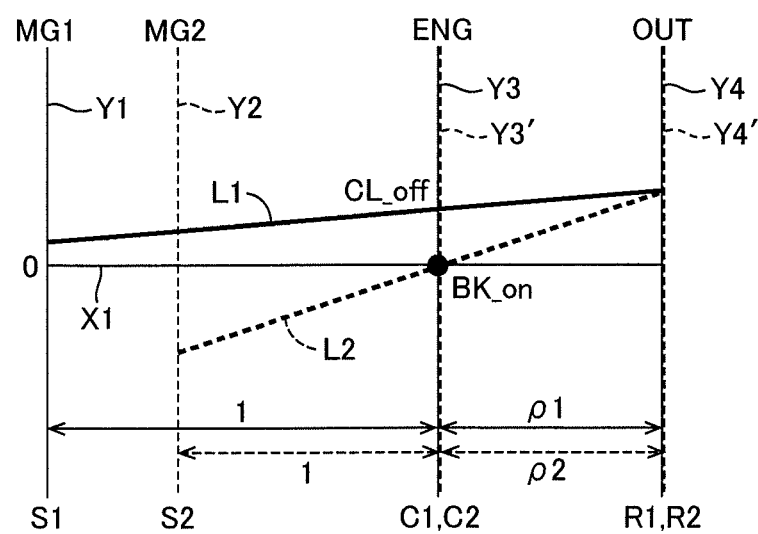
FIG. 3 is a table indicating combinations of operating states of a clutch and a brake, which correspond to respective five drive modes of the drive system of FIG. 1.
FIG. 4 is a collinear chart having straight lines which permit indication thereon of relative rotating speeds of various rotary elements of the drive system of FIG. 1, the collinear chart corresponding to the modes 1 and 3 of FIG. 3.

In the hybrid vehicle provided with the drive system 10 constructed as described above, one of a plurality of drive modes is selectively established according to the operating states of the engine 12, first electric motor MG1 and second electric motor MG2, and the operating states of the clutch CL and brake BK. FIG. 3 is the table indicating combinations of the operating states of the clutch CL and brake BK, which correspond to the respective five drive modes of the drive system 10. In this table, "o" marks represent an engaged state while blanks represent a released state. The drive modes EV-1 and EV-2 indicated in FIG. 3 are EV drive modes in which the engine 12 is held at rest while at least one of the first electric motor MG1 and second electric motor MG2 is used as a vehicle drive power source. The drive modes HV-1, HV-2 and HV-3 are hybrid drive modes (HV modes) in which the engine 12 is operated as the vehicle drive power source while the first electric motor MG1 and second electric motor MG2 are operated as needed to generate a vehicle drive force and/or an electric energy. In these hybrid drive modes, at least one of the first electric motor MG1 and second electric motor MG2 is operated to generate a reaction force or placed in a non-load free state.

As is apparent from FIG. 3, the EV drive modes of the drive system 10 in which the engine 12 is held at rest while at least one of the first electric motor MG1 and second electric motor MG2 is used as the vehicle drive power source consist of: a mode 1 (drive mode 1) in the form of the drive mode EV-1 which is established in the engaged state of the brake BK and in the released state of the clutch CL; and a mode 2 (drive mode 2) in the form of the drive mode EV-2 which is established in the engaged states of both of the brake BK and clutch CL. The hybrid drive modes in which the engine 12 is operated as the vehicle drive power source while the first electric motor MG1 and second electric motor MG2 are operated as needed to generate a vehicle drive force and/or an electric energy, consist of: a mode 3 (drive mode 3) in the form of the drive mode HV-1 which is established in the engaged state of the brake BK and in the released state of the clutch CL; a mode 4 (drive mode 4) in the form of the drive mode HV-2 which is established in the released state of the brake BK and in the engaged state of the clutch CL; and a mode 5 (drive mode 5) in the form of the drive mode HV-3 which is established in the released states of both of the brake BK and clutch CL.

FIGS. 4-7 are the collinear charts having straight lines which permit indication thereon of relative rotating speeds of the various rotary elements of the drive system 10 (first planetary gear set 14 and second planetary gear set 16), which rotary elements are connected to each other in different manners corresponding to respective combinations of the operating states of the clutch CL and brake BK. These collinear charts are defined in a two-dimensional coordinate system having a horizontal axis along which relative gear ratios ρ of the first and second planetary gear sets 14 and 16 are taken, and a vertical axis along which the relative rotating speeds are taken. The collinear charts indicate the relative rotating speeds when the output gear 30 is rotated in the positive direction to drive the hybrid vehicle in the forward direction. A horizontal line X1 represents the rotating speed of zero, while vertical lines Y1 through Y4 arranged in the order of description in the rightward direction represent the respective relative rotating speeds of the sun gear S1, sun gear S2, carrier C1 and ring gear R1. Namely, a solid line Y1 represents the relative rotating speed of the sun gear S1 of the first planetary gear set 14 (operating speed of the first electric motor MG1), a broken line Y2 represents the relative rotating speed of the sun gear S2 of the second planetary gear set 16 (operating speed of the second electric motor MG2), a solid line Y3 represents the relative rotating speed of the carrier C1 of the first planetary gear set 14 (operating speed of the engine 12), a broken line Y3' represents the relative rotating speed of the carrier C2 of the second planetary gear set 16, a solid line Y4 represents the relative rotating speed of the ring gear R1 of the first planetary gear set 14 (rotating speed of the output gear 30), and a broken line Y4' represents the relative rotating speed of the ring gear R2 of the second planetary gear set 16. In FIGS. 4-7, the vertical lines Y3 and Y3' are superimposed on each other, while the vertical lines Y4 and Y4' are superimposed on each other. Since the ring gears R1 and R2 are fixed to each other, the relative rotating speeds of the ring gears R1 and R2 represented by the vertical lines Y4 and Y4' are equal to each other.

In FIGS. 4-7, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2-Y4') are determined by the gear ratios ρ1 and ρ2 of the first and second planetary gear sets 14 and 16. Described more specifically, regarding the vertical lines Y1, Y3 and Y4 corresponding to the respective three rotary elements in the form of the sun gear S1, carrier C1 and ring gear R1 of the first planetary gear set 14, a distance between the vertical lines Y1 and Y3 corresponds to "1", while a distance between the vertical lines Y3 and Y4 corresponds to the gear ratio "ρ1". Regarding the vertical lines Y2, Y3' and Y4' corresponding to the respective three rotary elements in the form of the sun gear S2, carrier C2 and ring gear R2 of the second planetary gear set 16, a distance between the vertical lines Y2 and Y3' corresponds to "1", while a distance between the vertical lines Y3' and Y4' corresponds to the gear ratio "ρ2". In the drive system 10, the gear ratio ρ2 of the second planetary gear set 16 is higher than the gear ratio ρ1 of the first planetary gear set 14 (ρ2>ρ1). The drive modes of the drive system 10 will be described by reference to FIGS. 4-7.

The drive mode EV-1 indicated in FIG. 3 corresponds to the mode 1 (drive mode 1) of the drive system 10, which is preferably the EV drive mode in which the engine 12 is held at rest while the second electric motor MG2 is used as the vehicle drive power source. FIG. 4 is the collinear chart corresponding to the mode 1. Described by reference to this collinear chart, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 1, the rotating direction of the sun gear S2 and the rotating direction of the ring gear R2 in the second planetary gear set 16 are opposite to each other, so that when the second electric motor MG2 is operated to generate a negative torque (acting in the negative direction), the ring gear R2, that is, the output gear 30 is rotated in the positive direction by the generated negative torque. Namely, the hybrid vehicle provided with the drive system 10 is driven in the forward direction when the negative torque is generated by the second electric motor MG2. In this case, the first electric motor MG1 is preferably held in a free state. In this mode 1, the carriers C1 and C2 are permitted to be rotated relative to each other, so that the hybrid vehicle can be driven in the EV drive mode similar to an EV drive mode which is established in a vehicle provided with a so-called "THS" (Toyota Hybrid System) and in which the carrier C2 is fixed to the stationary member.

Figure 5:
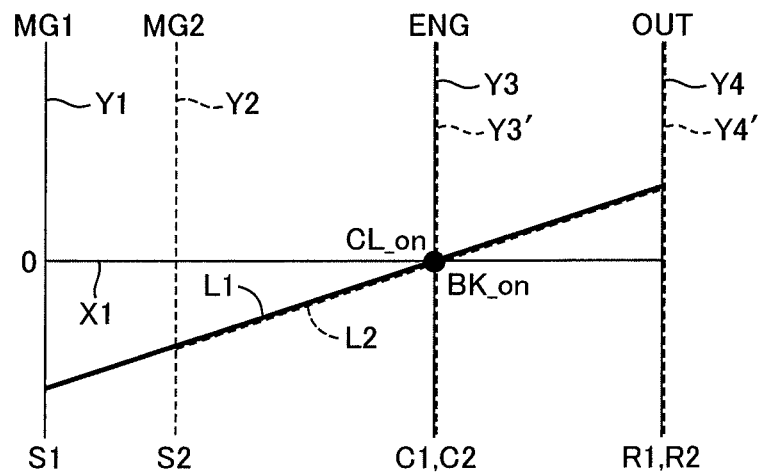
FIG. 5 is a collinear chart having straight lines which permit indication thereon of relative rotating speeds of various rotary elements of the drive system of FIG. 1, the collinear chart corresponding to the mode 2 of FIG. 3.

The drive mode EV-2 indicated in FIG. 3 corresponds to the mode 2 (drive mode 2) of the drive system 10, which is preferably the EV drive mode in which the engine 12 is held at rest while at least one of the first electric motor MG1 and second electric motor MG2 is used as the vehicle drive power source. FIG. 5 is the collinear chart corresponding to the mode 2. Described by reference to this collinear chart, the carrier C1 of the first planetary gear set 14 and the carrier C2 of the second planetary gear set 16 are not rotatable relative to each other in the engaged state of the clutch CL. Further, in the engaged state of the brake BK, the carrier C2 of the second planetary gear set 16 and the carrier C1 of the first planetary gear set 14 which is connected to the carrier C2 are coupled (fixed) to the stationary member in the form of the housing 26, so that the rotating speeds of the carriers C1 and C2 are held zero. In this mode 2, the rotating direction of the sun gear S1 and the rotating direction of the ring gear R1 in the first planetary gear set 14 are opposite to each other, and the rotating direction of the sun gear S2 and the rotating direction of the ring gear R2 in the second planetary gear set 16 are opposite to each other, so that when the first electric motor MG1 and/or second electric motor MG2 is/are operated to generate a negative torque (acting in the negative direction), the ring gears R1 and R2 are rotated, that is, the output gear 30 is rotated in the positive direction by the generated negative torque. Namely, the hybrid vehicle provided with the drive system 10 is driven in the forward direction when the negative torque is generated by at least one of the first electric motor MG1 and second electric motor MG2.

In the mode 2, at least one of the first electric motor MG1 and second electric motor MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery 55. Namely, the mode 2 is an EV drive mode in which amounts of work to be assigned to the first and second electric motors MG1 and MG2 can be adjusted with respect to each other, and which may be established under various running conditions of the hybrid vehicle, or may be kept for a relatively long length of time. Accordingly, the mode 2 is advantageously provided on a hybrid vehicle such as a plug-in hybrid vehicle, which is frequently placed in an EV drive mode.

The drive mode HV-1 indicated in FIG. 3 corresponds to the mode 3 (drive mode 3) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 4 is the collinear chart corresponding to the mode 3. Described by reference to this collinear chart, the carrier C1 of the first planetary gear set 14 and the carrier C2 of the second planetary gear set 16 are rotatable relative to each other, in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 3, the engine 12 is operated to generate an output torque by which the output gear 30 is rotated. At this time, the first electric motor MG1 is operated to generate a reaction torque in the first planetary gear set 14, so that the output of the engine 12 can be transmitted to the output gear 30. In the second planetary gear set 16, the rotating direction of the sun gear S2 and the rotating direction of the ring gear R2 are opposite to each other, in the engaged state of the brake BK, so that when the second electric motor MG2 is operated to generate a negative torque (acting in the negative direction), the ring gears R1 and R2 are rotated, that is, the output gear 30 is rotated in the positive direction by the generated negative torque.

Figure 6:
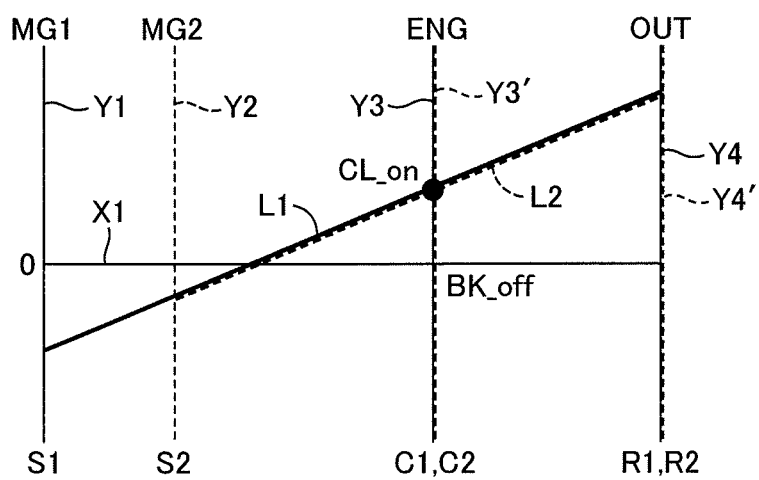
FIG. 6 is a collinear chart having straight lines which permit indication thereon of relative rotating speeds of various rotary elements of the drive system of FIG. 1, the collinear chart corresponding to the mode 4 of FIG. 3.

The drive mode HV-2 indicated in FIG. 3 corresponds to the mode 4 (drive mode 4) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 6 is the collinear chart corresponding to the mode 4. Described by reference to this collinear chart, the carrier C1 of the first planetary gear set 14 and the carrier C2 of the second planetary gear set 16 are not rotatable relative to each other, in the engaged state of the clutch CL, that is, the carriers C1 and C2 are integrally rotated as a single rotary element. The ring gears R1 and R2, which are fixed to each other, are integrally rotated as a single rotary element. Namely, in the mode 4 of the drive system 10, the first planetary gear set 14 and second planetary gear set 16 function as a differential mechanism having a total of four rotary elements. That is, the drive mode 4 is a composite split mode in which the four rotary elements consisting of the sun gear S1 (connected to the first electric motor MG1), the sun gear S2 (connected to the second electric motor MG2), the rotary element constituted by the carriers C1 and C2 connected to each other (and to the engine 12), and the rotary element constituted by the ring gears R1 and R2 fixed to each other (and connected to the output gear 30) are connected to each other in the order of description in the rightward direction as seen in FIG. 6.

In the mode 4, the rotary elements of the first planetary gear set 14 and second planetary gear set 16 are preferably arranged as indicated in the collinear chart of FIG. 6, that is, in the order of the sun gear S1 represented by the vertical line Y1, the sun gear S2 represented by the vertical line Y2, the carriers C1 and C2 represented by the vertical line Y3 (Y3'), and the ring gears R1 and R2 represented by the vertical line Y4 (Y4'). The gear ratios $\rho 1$ and $\rho 2$ of the first and second planetary gear sets 14 and 16 are determined such that the vertical line Y1 corresponding to the sun gear S1 and the vertical line Y2 corresponding to the sun gear S2 are positioned as indicated in the collinear chart of FIG. 6, namely, such that the distance between the vertical lines Y1 and Y3 is longer than the distance between the vertical lines Y2 and Y3'. In other words, the distance between the vertical lines corresponding to the sun gear S1 and the carrier C1 and the distance between the vertical lines corresponding to the sun gear S2 and the carrier C2 correspond to "1", while the distance between the vertical lines corresponding to the carrier C1 and the ring gear R1 and the distance between the vertical lines corresponding to the carrier C2 and the ring gear R2 correspond to the respective gear ratios $\rho 1$ and $\rho 2$. Accordingly, the drive system 10 is configured such that the gear ratio $\rho 2$ of the second planetary gear set 16 is higher than the gear ratio $\rho 1$ of the first planetary gear set 14.

In the mode 4, the carrier C1 of the first planetary gear set 14 and the carrier C2 of the second planetary gear set 16 are connected to each other in the engaged state of the clutch CL, so that the carriers C1 and C2 are rotated integrally with each other. Accordingly, either one or both of the first electric motor MG1 and second electric motor MG2 can receive a reaction force corresponding to the output of the engine 12. Namely, one or both of the first and second electric motors MG1 and MG2 can be operated to receive the reaction force during an operation of the engine 12, and each of the first and second electric motors MG1 and MG2 can be operated at an operating point assuring a relatively high degree of operating efficiency, and/or with a reduced degree of torque limitation due to heat generation. For example, one of the first and second electric motors MG1 and MG2 which is operable with a high degree of operating efficiency is preferentially operated to generate a reaction force, so that the overall operating efficiency can be improved. Further, where there is a torque limitation of one of the first electric motor MG1 and second electric motor MG2 due to heat generation, it is possible to ensure the generation of the reaction force required for the engine 12, by controlling the other electric motor so as to perform a regenerative operation or a vehicle driving operation, for providing an assisting vehicle driving force.

Figure 7:
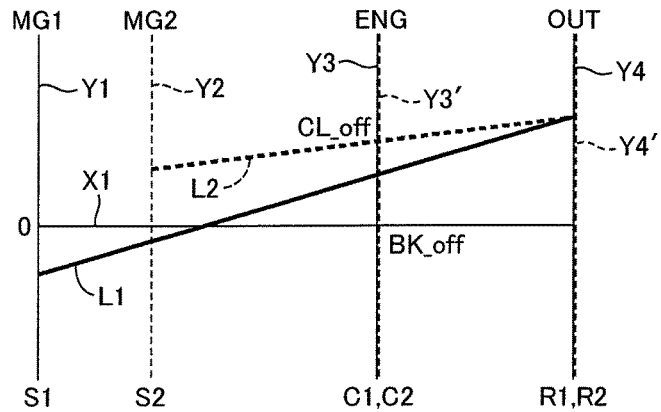
FIG. 7 is a collinear chart having straight lines which permit indication thereon of relative rotating speeds of various rotary elements of the drive system of FIG. 1, the collinear chart corresponding to the mode 5 of FIG. 3.

The drive mode HV-3 indicated in FIG. 3 corresponds to the mode 5 (drive mode 5) of the drive system 10, which is preferably the hybrid drive mode in which the engine 12 is operated as the vehicle drive power source while the first electric motor MG1 is operated as needed to generate a vehicle drive force and/or an electric energy. In this mode 5, the engine 12 and first electric motor MG1 may be operated to generate a vehicle drive force, with the second electric motor MG2 being disconnected from a drive system. FIG. 7 is the collinear chart corresponding to this mode 5. Described by reference to this collinear chart, the carrier C1 of the first planetary gear set 14 and the carrier C2 of the second planetary gear set 16 are rotatable relative to each other in the released state of the clutch CL. In the released state of the brake BK, the carrier C2 of the second planetary gear set 16 is rotatable relative to the stationary member in the form of the housing 26. In this arrangement, the second electric motor MG2 can be held at rest while it is disconnected from the drive system (power transmitting path).

In the mode 3 in which the brake BK is placed in the engaged state, the second electric motor MG2 is kept in an operated state together with a rotary motion of the output gear 30 (ring gear R2) during running of the vehicle. In this operating state, the operating speed of the second electric motor MG2 may reach an upper limit value (upper limit) during running of the vehicle at a comparatively high speed, or a rotary motion of the ring gear R2 at a high speed is transmitted to the sun gear S2. In this respect, it is not necessarily desirable to keep the second electric motor MG2 in the operated state during running of the vehicle at a comparatively high speed, from the standpoint of the operating efficiency. In the mode 5, on the other hand, the engine 12 and the first electric motor MG1 may be operated to generate the vehicle drive force during running of the vehicle at the comparatively high speed, while the second electric motor MG2 is disconnected from the drive system, so that it is possible to reduce a power loss due to dragging of the unnecessarily operated second electric motor MG2, and to eliminate a limitation of the highest vehicle running speed corresponding to the permissible highest operating speed (upper limit of the operating speed) of the second electric motor MG2.

It will be understood from the foregoing description, the drive system 10 is selectively placed in one of the three hybrid drive modes in which the engine 12 is operated as the vehicle drive power source, namely, in one of the drive mode HV-1 (mode 3), drive mode HV-2 (mode 4) and drive mode HV-3 (mode 5), which are selectively established by respective combinations of the engaged and released states of the clutch CL and brake BK. Accordingly, the transmission efficiency can be improved to improve the fuel economy of the vehicle, by selectively establishing one of the three hybrid drive modes according to the vehicle running speed and the speed ratio, in which the transmission efficiency is the highest.

Figure 8:
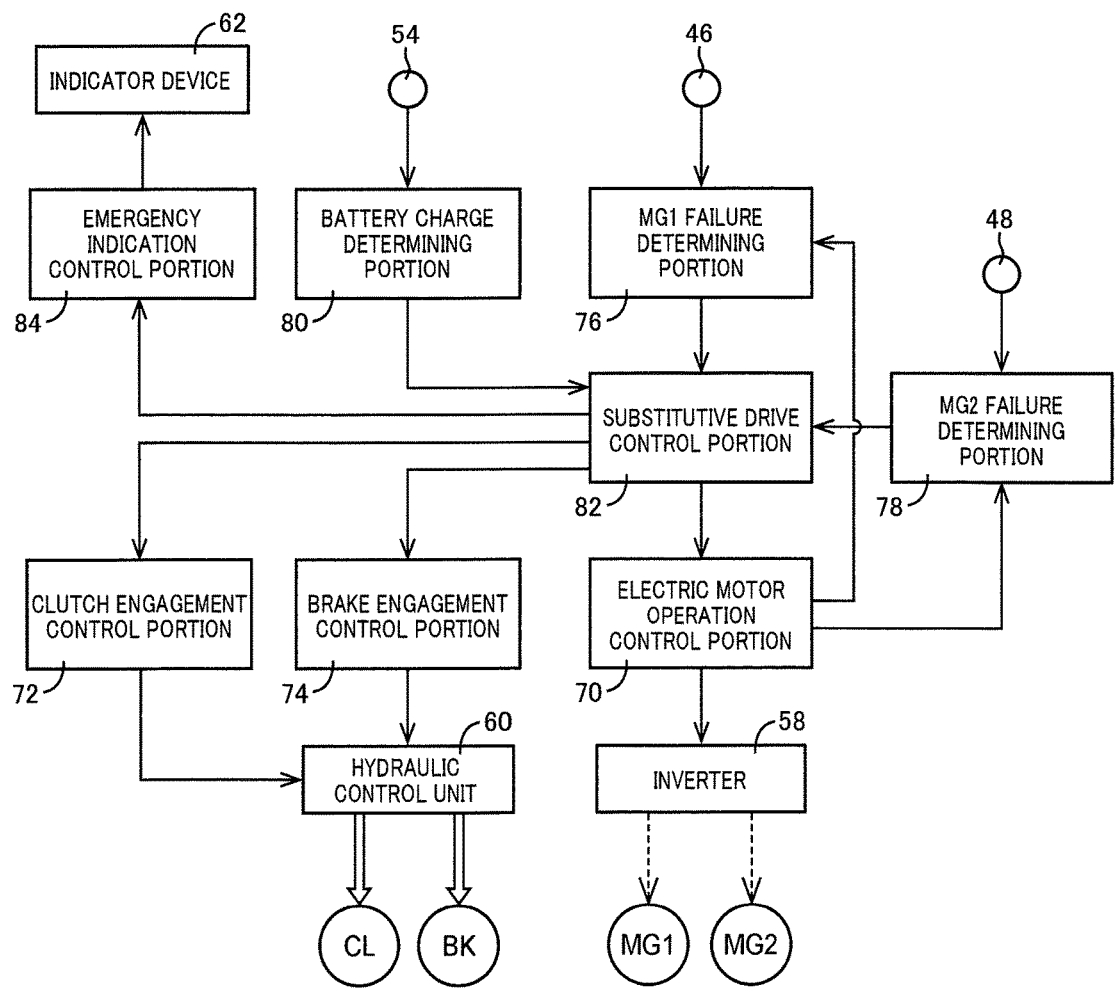
FIG. 8 is a functional block diagram for explaining major control functions of an electronic control device of FIG. 2.

FIG. 8 is the functional block diagram for explaining major control functions of the electronic control device 40. An electric motor operation control portion 70, shown in FIG. 8, is configured to control the operations of the first and second electric motors MG1 and MG2 through the inverter 58. Described more specifically, the electric motor operation control portion 70 controls the amounts of electric energy to be supplied from the battery 55 to the first and second electric motors MG1 and MG2 through the inverter 58, so that each of the first and second electric motors MG1 and MG2 provides a required output, that is, a target torque (target electric motor output). When the first or second electric motor MG1, MG2 is operated as an electric generator, the electric motor operation control portion 70 implements a control for storing an electric energy generated by the first or second electric motor MG1, MG2, in the battery 55 through the inverter 58.

A clutch engagement control portion 72 is configured to control the operating state of the clutch CL through the hydraulic control unit 60. For instance, the clutch engagement control portion 72 controls an output hydraulic pressure of an electromagnetic control valve provided in the hydraulic control unit 60 to control the clutch CL, so as to place the clutch CL in an engaged state or a released state. A brake engagement control portion 74 is configured to control the operating state of the brake BK through the hydraulic control unit 60. For instance, the brake engagement control portion 74 controls an output hydraulic pressure of an electromagnetic control valve provided in the hydraulic control unit 60 to control the brake BK, so as to place the brake BK in an engaged state or a released state. The clutch engagement control portion 72 and the brake engagement control portion 74 are basically configured to control the operating states of the clutch CL and the brake BK to establish the drive mode selected according to the running state of the hybrid vehicle as described above. Namely, the clutch and brake engagement control portions 72 and 74 establish one of the combinations of the operating states of the clutch CL and the brake BK indicated in FIG. 3, which corresponds to one of the modes 1-5 to be established.

An MG1 failure determining portion 76 is configured to determine a failure of the first electric motor MG1. Namely, the MG1 failure determining portion 76 determines whether the first electric motor MG1 has an operational defect preventing its normal operation. For example, the MG1 failure determining portion 76 makes the determination as to whether the first electric motor MG1 has an operational defect, on the basis of a difference of the first electric motor speed $N_{MG1}$ detected by the MG1 speed sensor 46, with respect to a value of a command generated from the electric motor operation control portion 70 to specify an output of the first electric motor MG1. Described more specifically, the MG1 failure determining portion 76 determines a failure of the first electric motor MG1, if the difference of the first electric motor speed $N_{MG1}$ detected by the MG1 speed sensor 46 with respect to the value of the command generated from the electric motor operation control portion 70 to specify the output of the first electric motor MG1 has become equal to or larger than a predetermined value. For instance, the MG1 failure determining portion 76 determines that the first electric motor MG1 has a locking defect caused by its seizure, for example, if the first electric motor speed $N_{MG1}$ detected by the MG1 speed sensor 46 is zero where the command generated from the electric motor operation control portion 70 specifies a given output value of the first electric motor MG1 corresponding to the predetermined speed.

An MG2 failure determining portion 78 is configured to determine a failure of the second electric motor MG2. Namely, the MG2 failure determining portion 78 determines whether the second electric motor MG2 has an operational defect preventing its normal operation. For example, the MG2 failure determining portion 78 makes the determination as to whether the second electric motor MG2 has an operational defect, on the basis of a difference of the second electric motor speed $N_{MG2}$ detected by the MG2 speed sensor 48, with respect to a value of a command generated from the electric motor operation control portion 70 to specify an output of the second electric motor MG2. Described more specifically, the MG2 failure determining portion 78 determines a failure of the second electric motor MG2, if the difference of the second electric motor speed $N_{MG2}$ detected by the MG2 speed sensor 48 with respect to the value of the command generated from the electric motor operation control portion 70 to specify the output of the second electric motor MG2 has become equal to or larger than a predetermined value. For instance, the MG2 failure determining portion 78 determines that the second electric motor MG2 has a locking defect caused by its seizure, for example, if the second electric motor speed $N_{MG2}$ detected by the MG2 speed sensor 48 is zero where the command generated from the electric motor operation control portion 70 specifies a given output value of the second electric motor MG2 corresponding to the predetermined speed.

A battery charge determining portion 80 is configured to determine whether the amount of electric energy stored in the battery 55 is within a predetermined range. Preferably, the battery charge determining portion 80 determines whether the stored electric energy amount SOC detected by the battery SOC sensor 54 is smaller than a predetermined threshold value $SOC_{em}$ ($SOC_{bo1}$). For example, this threshold value $SOC_{em}$ ($SOC_{bo1}$) corresponds to a discharging limit value (output limit value $W_{out}$) of the battery 55. Preferably, the battery charge determining portion 80 determines whether the stored electric energy amount SOC detected by the battery SOC sensor 54 is equal to or larger than a predetermined threshold value $SOC_{bo2}$. For example, this threshold value $SOC_{bo2}$ corresponds to a charging limit value (input limit value $W_{in}$) of the battery 55.

A substitutive drive control portion 82 is configured to implement a substitutive drive control, in the event of a failure of the first electric motor MG1 or the second electric motor MG2. Described more specifically, the substitutive drive control portion 82 alternately implements a vehicle driving control and a battery charging control, in the event of the determination of a failure of the first electric motor MG1 by the MG1 failure determining portion 76, or in the event of the determination of a failure of the second electric motor MG2 by the MG2 failure determining portion 78. The vehicle driving control is implemented to operate the first or second electric motor MG1 or MG2 not failing to operate (hereinafter referred to simply as "electric motor MG"), for generating a vehicle drive force, and the battery charging control is implemented to charge the vehicle driving battery 55, with the electric motor MG. Preferably, the substitutive drive control portion 82 switches the vehicle driving control and the battery charging control from one to the other, depending upon the electric energy amount stored in the battery 55, that is, the stored electric energy amount SOC detected by the battery SOC sensor 54. The substitutive drive control implemented by the substitutive drive control portion 82 will be described in detail.

The substitutive drive control portion 82 is preferably configured to implement the battery charging control to charge the battery 55 with the engine 12 and the second electric motor MG2, in the engaged state of the clutch CL and in the released state of the brake BK, where the electric energy amount stored in the battery 55 is smaller than the predetermined threshold value $SOC_{em}$, in the event of the failure of the first electric motor MG1. Namely, when the battery charge determining portion 80 determines that the electric energy amount stored in the battery 55 is smaller than the predetermined threshold value $SOC_{em}$, while the MG1 failure determining portion 76 determines the failure of the first electric motor MG1, the substitutive drive control portion 82 commands the clutch engagement control portion 72 to place the clutch CL in the engaged state, commands the brake engagement control portion 74 to place the brake BK in the released state, commands the engine 12 to be operated, and commands the electric motor operation control portion 70 to operate the second electric motor MG2 to generate an electric energy for charging the battery 55. Preferably, the substitutive drive control portion 82 implements the battery charging control where the hybrid vehicle is held stationary, that is, where the vehicle running speed V corresponding to the output speed $N_{OUT}$ detected by the output speed sensor 50 is zero (where the output shaft is placed in the locked state).

Figure 9:
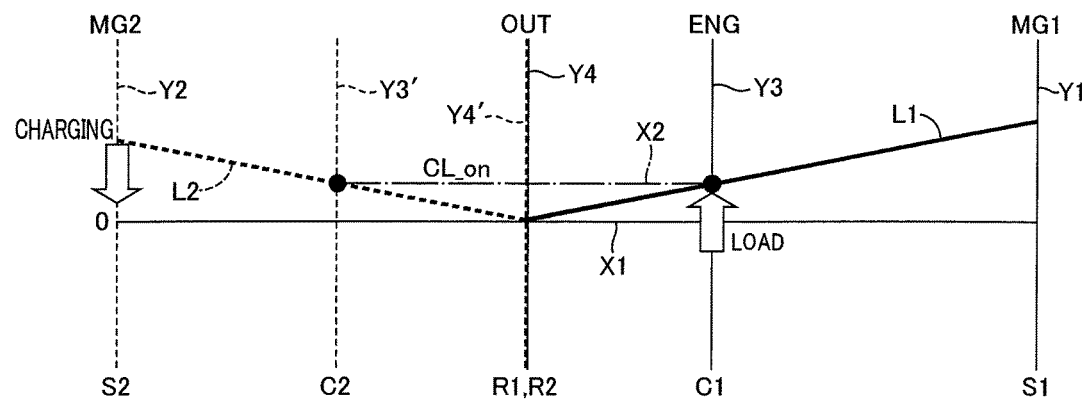
FIG. 9 is a collinear chart having straight lines which permit indication thereof relative rotating speeds of various rotary elements of the drive system of FIG. 1, the collinear chart corresponding to a battery charging control implemented in the event of a failure of a first electric motor.

FIG. 9 is a collinear chart for explaining the battery charging control implemented in the event of the failure of the first electric motor MG1. In this collinear chart, a vertical line Y4 (Y4') corresponding to the output gear 30 (ring gears R1 and R2) is located in a central part of the chart, and vertical lines Y1 and Y3 corresponding to the rotary elements of the first planetary gear set 14 are located in a right-hand side part of the chart, while vertical lines Y2 and Y3' corresponding to the rotary elements of the second planetary gear set 16 are located in a left-hand side part of the chart (this positioning of the vertical lines applies to the collinear charts of FIGS. 10-12). One-dot chain line X2 indicates (rotating speeds in) a state in which the carriers C1 and C2 are connected to each other through the clutch CL. As indicated in FIG. 9, when the vehicle is held stationary, that is, when the rotating speed of the output gear 30 (ring gears R1 and R2) is zero, in the engaged state of the clutch CL and in the released state of the brake BK, the carrier C1 (carrier C2 connected to the carrier C1 through the clutch CL) is rotated with an operation of the engine 12, so that the second electric motor MG2 is operated with the engine 12, to generate an electric energy. The electric energy generated by the second electric motor MG2 is supplied to the battery 55, so that the battery 55 is charged.

Figure 10:
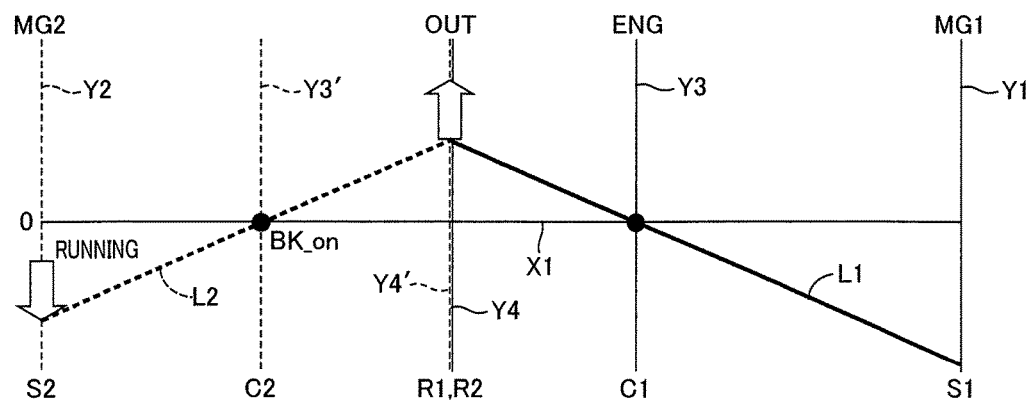
FIG. 10 is a collinear chart having straight lines which permit indication thereof relative rotating speeds of various rotary elements of the drive system of FIG. 1, the collinear chart corresponding to a vehicle driving control implemented in the event of the failure of the first electric motor.

The substitutive drive control portion 82 is preferably configured to implement an EV driving control to operate the second electric motor MG2 for generating the vehicle drive force, in the released state of the clutch CL and in the engaged state of the brake BK, where the electric energy amount stored in the battery 55 is equal to or larger than the predetermined threshold value $SOC_{em}$, in the event of the failure of the first electric motor MG1. Namely, when the battery charge determining portion 80 determines that the electric energy amount stored in the battery 55 is equal to or larger than the predetermined threshold value $SOC_{em}$, while the MG1 failure determining portion 76 determines the failure of the first electric motor MG1, the substitutive drive control portion 82 commands the clutch engagement control portion 72 to place the clutch CL in the released state, commands the brake engagement control portion 74 to place the brake BK in the engaged state, and commands the electric motor operation control portion 70 to operate the second electric motor MG2 to generate the vehicle drive force. That is, the substitutive drive control portion 82 implements the EV running by establishing the mode 1 (EV-1) and using primarily the second electric motor MG2 as the vehicle drive power source. FIG. 10 is the collinear chart for explaining the vehicle driving control in the event of the failure of the first electric motor MG1. As indicated in FIG. 10, the second electric motor MG2 generates a negative torque in the engaged state of the brake BK, so that the output gear 30 (ring gears R1 and R2) is (are) rotated in the positive direction. As a result, the vehicle drive force to drive the hybrid vehicle provided with the drive system 10 in the forward direction is generated.

Figure 11:
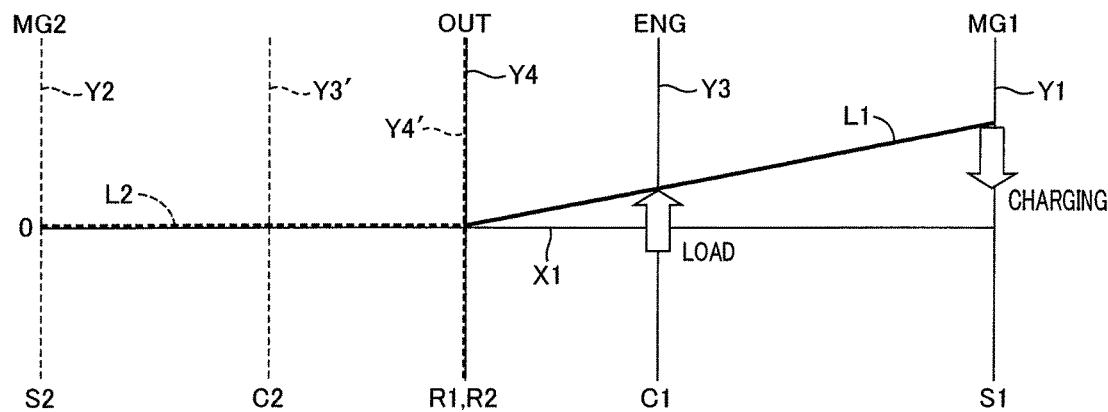
FIG. 11 is a collinear chart having straight lines which permit indication thereof relative rotating speeds of various rotary elements of the drive system of FIG. 1, the collinear chart corresponding to a battery charging control implemented in the event of a failure of a second electric motor.

The substitutive drive control portion 82 is preferably configured to implement the battery charging control to charge the battery 55 with the engine 12 and the first electric motor MG1, in the released states of both of the clutch CL and the brake BK, where the electric energy amount stored in the battery 55 is smaller than the predetermined threshold value $SOC_{em}$, in the event of the failure of the second electric motor MG2. Namely, when the battery charge determining portion 80 determines that the electric energy amount stored in the battery 55 is smaller than the predetermined threshold value $SOC_{em}$, while the MG2 failure determining portion 78 determines the failure of the second electric motor MG2, the substitutive drive control portion 82 commands the clutch engagement control portion 72 to place the clutch CL in the released state, commands the brake engagement control portion 74 to place the brake BK in the released state, commands the engine 12 to be operated, and commands the electric motor operation control portion 70 to operate the first electric motor MG1 to generate an electric energy for charging the battery 55. Preferably, the substitutive drive control portion 82 implements the battery charging control where the hybrid vehicle is held stationary, that is, where the vehicle running speed V corresponding to the output speed $N_{OUT}$ detected by the output speed sensor 50 is zero (where the output shaft is placed in the locked state). FIG. 11 is the collinear chart for explaining the battery charging control in the event of the failure of the second electric motor MG2. As indicated in FIG. 11, when the hybrid vehicle is stationary, that is, when the rotating speed of the output gear 30 (ring gears R1 and R2) is zero, in the released states of both of the clutch CL and the brake BK, the carrier C1 is rotated with an operation of the engine 12, so that the first electric motor MG1 is operated with the engine 12, to generate an electric energy. The electric energy generated by the first electric motor MG1 is supplied to the battery 55, so that the battery 55 is charged. As described above, the second electric motor MG2 can be held at rest while being disconnected from the power transmitting system (power transmitting path), in the released states of the clutch CL and the brake BK.

Figure 12:
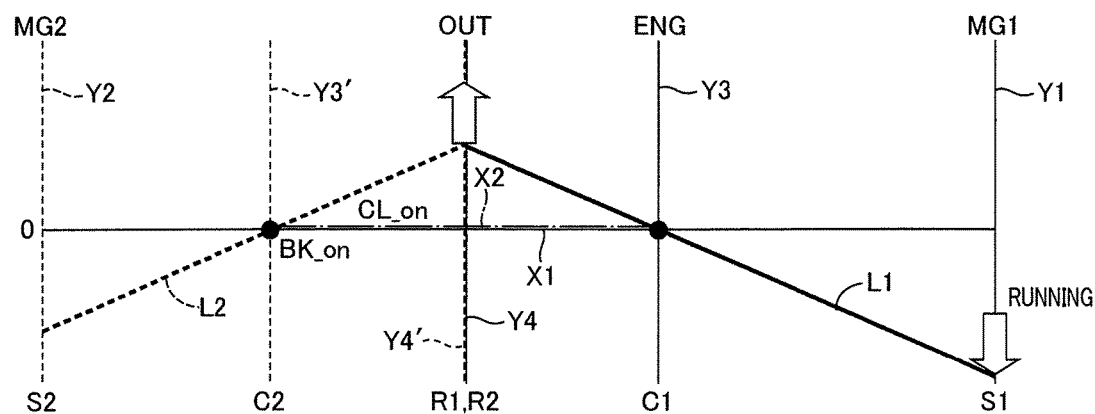
FIG. 12 is a collinear chart having straight lines which permit indication thereof relative rotating speeds of various rotary elements of the drive system of FIG. 1, the collinear chart corresponding to a vehicle driving control implemented in the event of the failure of the second electric motor.

The substitutive drive control portion 82 is preferably configured to implement the EV driving control to operate the first electric motor MG1 for generating the vehicle drive force, in the engaged states of both of the clutch CL and the brake BK, where the electric energy amount stored in the battery 55 is equal to or larger than the predetermined threshold value $SOC_{em}$, in the event of the failure of the second electric motor MG2. Namely, when the battery charge determining portion 80 determines that the electric energy amount stored in the battery 55 is equal to or larger than the predetermined threshold value $SOC_{em}$, while the MG2 failure determining portion 78 determines the failure of the second electric motor MG2, the substitutive drive control portion 82 commands the clutch engagement control portion 72 to place the clutch CL in the engaged state, commands the brake engagement control portion 74 to place the brake BK in the engaged state, and commands the electric motor operation control portion 70 to operate the first electric motor MG1 to generate the vehicle drive force. That is, the substitutive drive control portion 82 implements the EV running by establishing the mode 2 (EV-2) and using primarily the first electric motor MG1 as the vehicle drive power source. FIG. 12 is the collinear chart for explaining the vehicle driving control in the event of the failure of the second electric motor MG2. As indicated in FIG. 12, the first electric motor MG1 generates a negative torque in the engaged states of both of the clutch CL and the brake BK, so that the output gear 30 (ring gears R1 and R2) is (are) rotated in the positive direction. As a result, the vehicle drive force to drive the hybrid vehicle provided with the drive system 10 in the forward direction is generated.

An emergency indication control portion 84 shown in FIG. 8 is configured to command the indicator device 62 to provide instructional information relating to the vehicle driving control and the battery charging control in the event of a failure of the first electric motor MG1 or the second electric motor MG2. Namely, the emergency indication control portion 84 commands the indicator device 62 to provide instructional information relating to the substitutive drive control by the substitutive drive control portion 82, in the event of the determination of a failure of the first electric motor MG1 by the MG1 failure determining portion 76, or in the event of the determination of a failure of the second electric motor MG2 by the MG2 failure determining portion 78. The emergency indication control portion 84 is preferably configured to command the indicator device 62 to provide the instructional information prompting the vehicle operator to stop the hybrid vehicle and park the hybrid vehicle in a turnout until the charging of the battery 55 is completed, while the battery charging control is implemented to charge the battery 55 with the engine 12 and the non-failing electric motor MG. For example, the emergency indication control portion 84 commands the indicator device 62 to provide message information prompting the vehicle operator to park the hybrid vehicle on a shoulder of a roadway, and to operate a manually operated shifting device to the "P" position (parking position) until the charging of the battery is completed. In this "P" position of the manually operated shifting device, the hybrid vehicle is braked with a parking lock mechanism, for instance. Alternatively, the emergency indication control portion 84 commands the indicator device 62 to turn on an appropriate light for prompting the vehicle operator to conduct the above-indicated manipulation. During the vehicle driving control, that is, when the vehicle driving control is implemented to operate the non-failing electric motor MG for generating a vehicle drive force, the emergency indication control portion 84 commands the indicator device 62 to provide the instructional information indicating that the hybrid vehicle can be run. Alternatively, the emergency indication control portion 84 commands the indicator device 62 to turn off the above-indicated light which has been placed in the on state during the battery charging control, for informing the vehicle operator that the hybrid vehicle can be run.

The substitutive drive control portion 82 is preferably configured to implement the substitutive drive control in the event of a failure of one of the first and second electric motors MG1 and MG2, wherein an EV drive control and an HV drive control are alternately implemented. The EV drive control is implemented to operate primarily the other non-failing electric motor MG for generating a vehicle drive force, while the HV drive control is implemented to operate the engine 12 for generating a vehicle drive force, and to operate the non-failing electric motor MG to charge the battery 55. Where the MG2 failure determining portion 78 determines that the second electric motor MG2 has a locking defect caused by its seizure, the sun gear S2 of the second planetary gear set 16 is fixed to the stationary member in the form of the housing 26. In this event, the substitutive drive control portion 82 preferably switches the EV drive control and the HV drive control from one to the other, depending upon the electric energy amount stored in the battery 55, that is, the stored electric energy amount SOC detected by the battery SOC sensor 54. Described more specifically, where the electric energy amount stored in the battery 55 is smaller than the threshold value $SOC_{bo1}$ which is the output limit value of the battery 55, the engine 12 is operated to generate the vehicle drive force while the first electric motor MG1 is operated to generate an electric energy for charging the battery 55, in the engaged state of the clutch CL and in the released state of the brake BK. Where the electric energy amount stored in the battery 55 is equal to or larger than the threshold value $SOC_{bo2}$ which is the input limit value of the battery 55, the first electric motor MG1 is primarily operated to generate the vehicle drive force, in the engaged states of both of the clutch CL and the brake BK.

Figure 13:
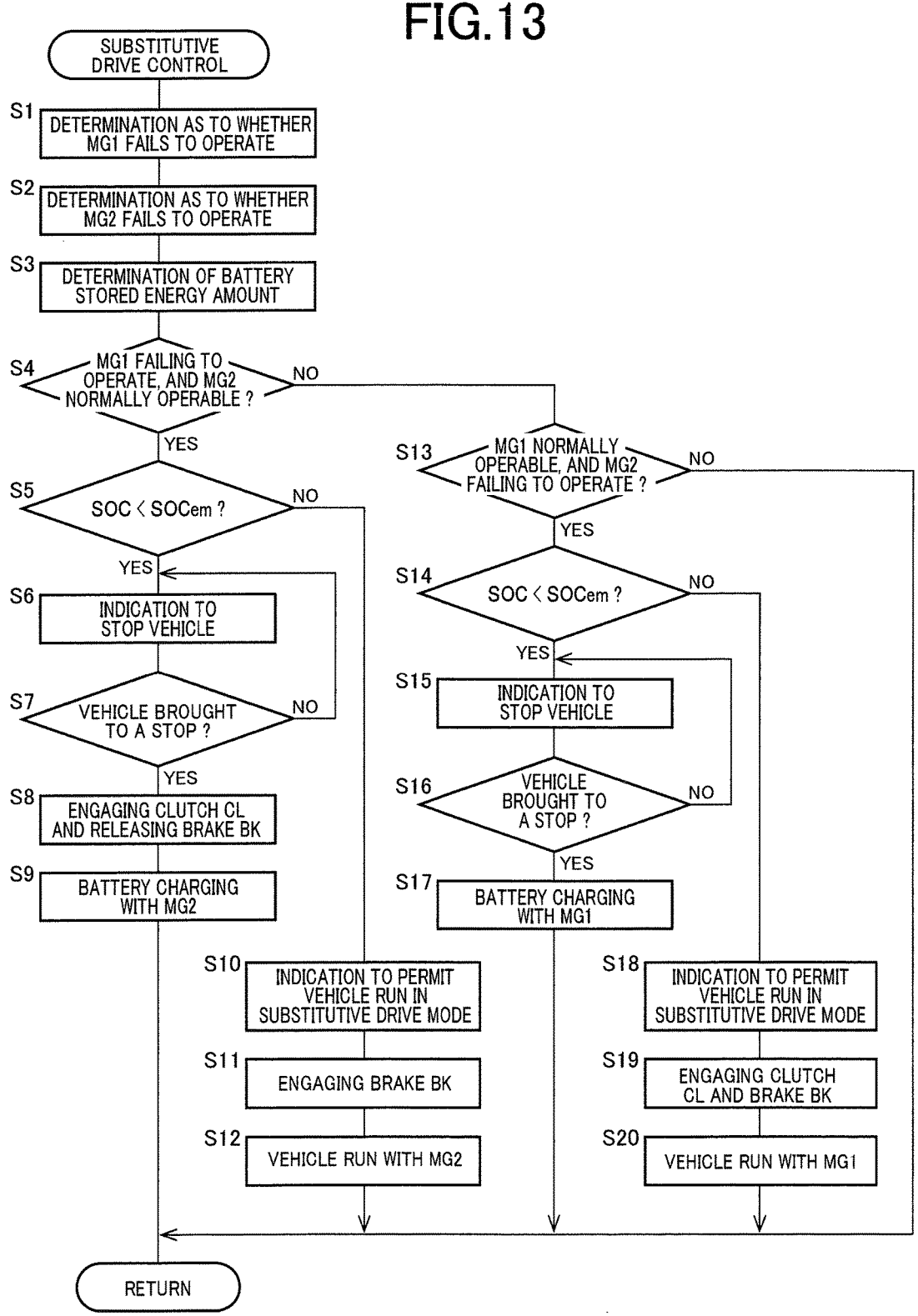
FIG. 13 is a flow chart for explaining a major portion of one example of a substitutive drive control implemented by the electronic control device of FIG. 2.
Figure 14:
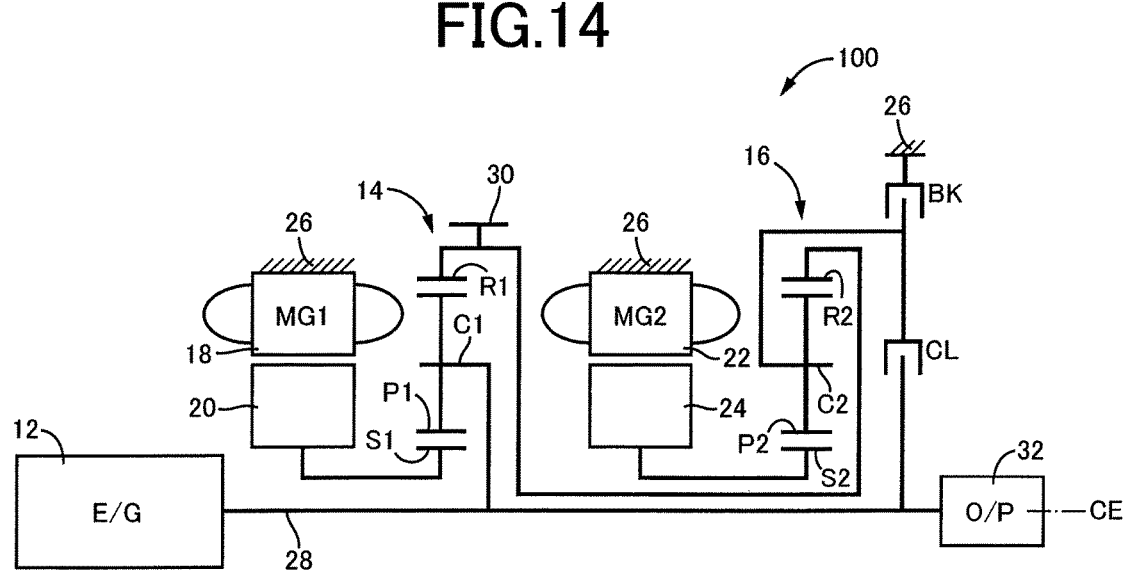
FIG. 14 is a schematic view for explaining an arrangement of a hybrid vehicle drive system according to another preferred embodiment of this invention.
Figure 15:
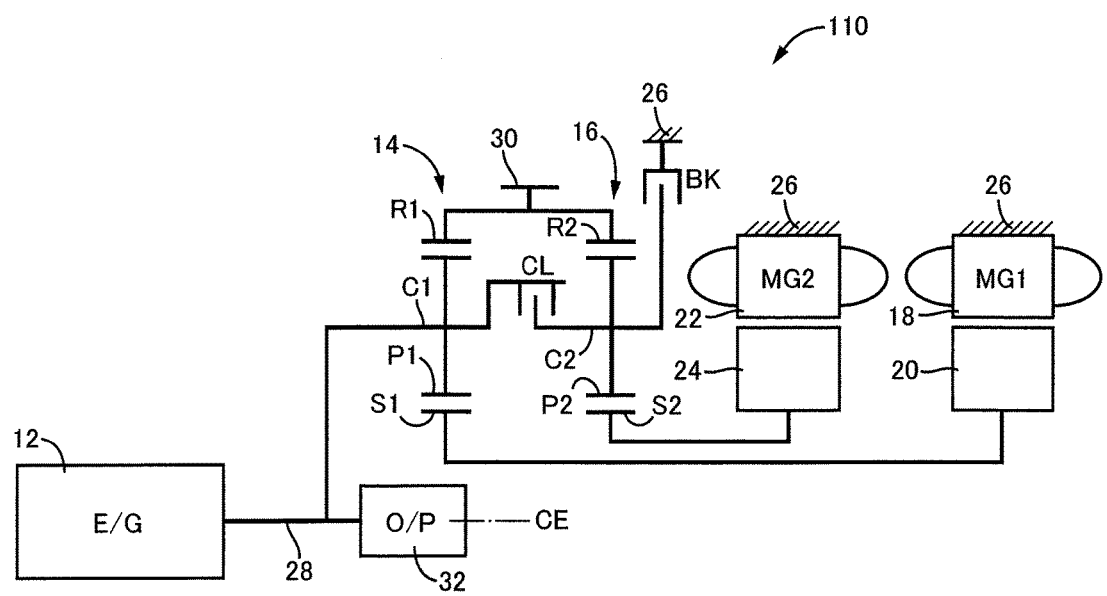
FIG. 15 is a schematic view for explaining an arrangement of a hybrid vehicle drive system according to a further preferred embodiment of this invention.
Figure 16:
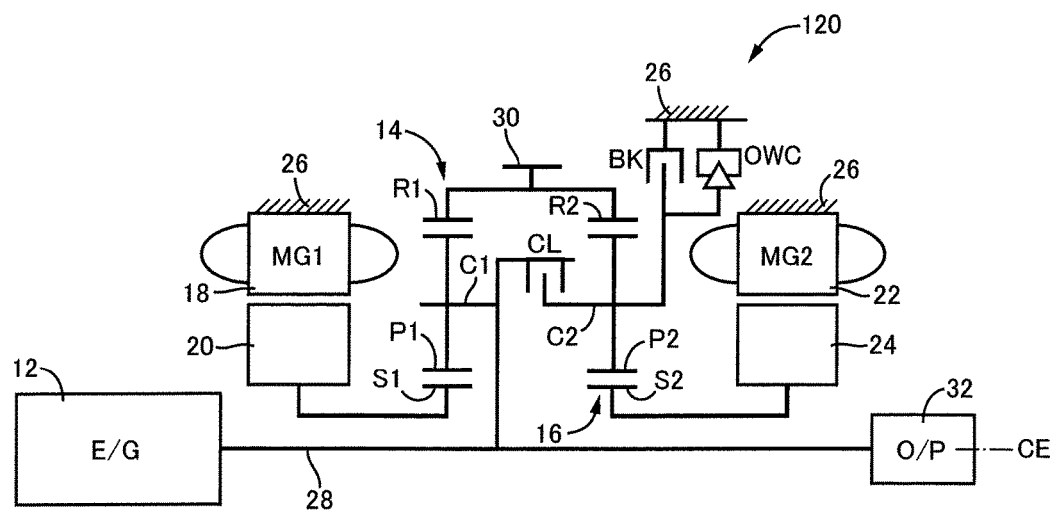
FIG. 16 is a schematic view for explaining an arrangement of a hybrid vehicle drive system according to a still further preferred embodiment of this invention.
Figure 17:
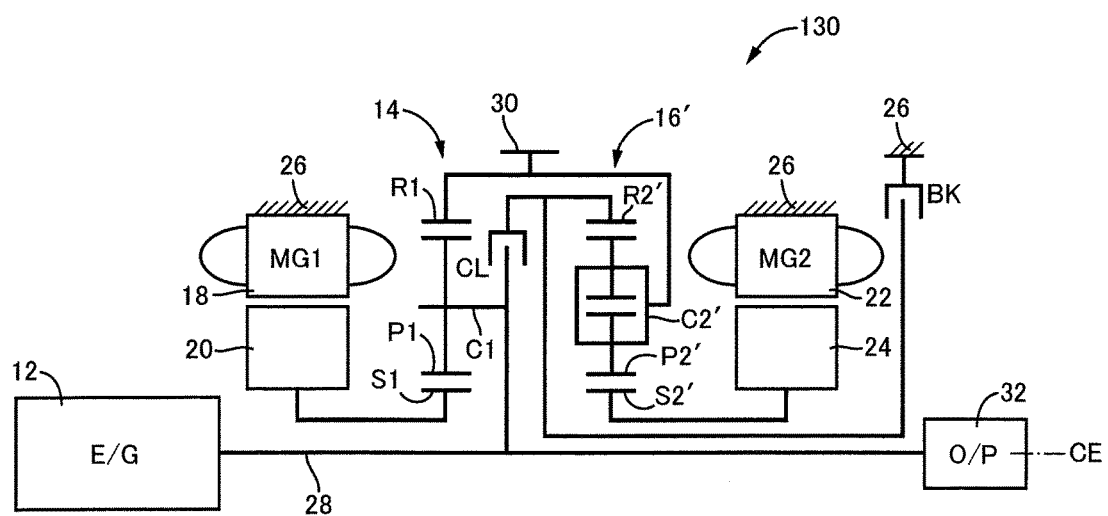
FIG. 17 is a schematic view for explaining an arrangement of a hybrid vehicle drive system according to a yet further preferred embodiment of this invention.
Figure 18:
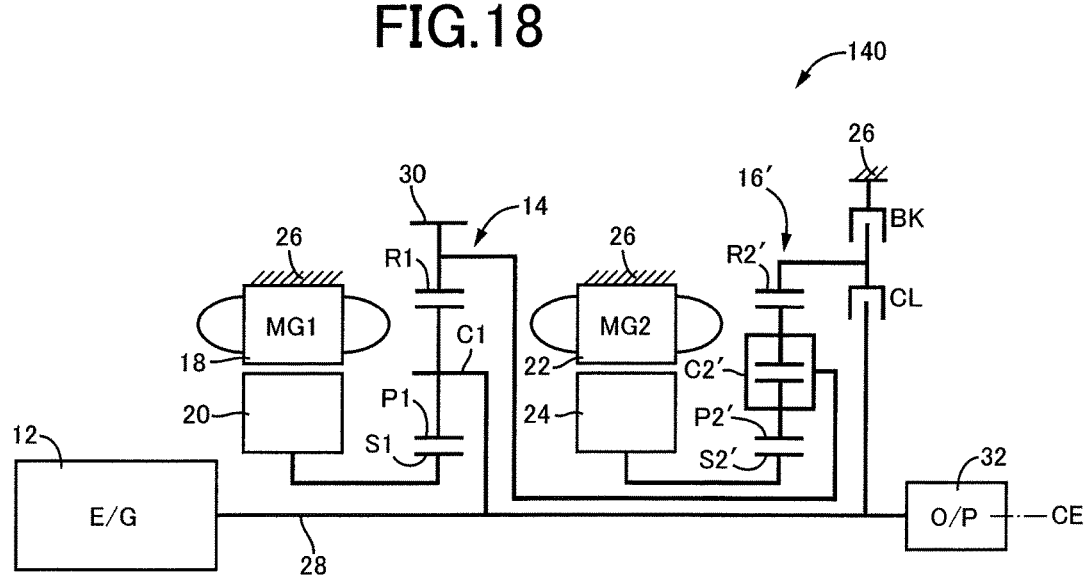
FIG. 18 is a schematic view for explaining an arrangement of a hybrid vehicle drive system according to still another preferred embodiment of this invention.
Figure 19:
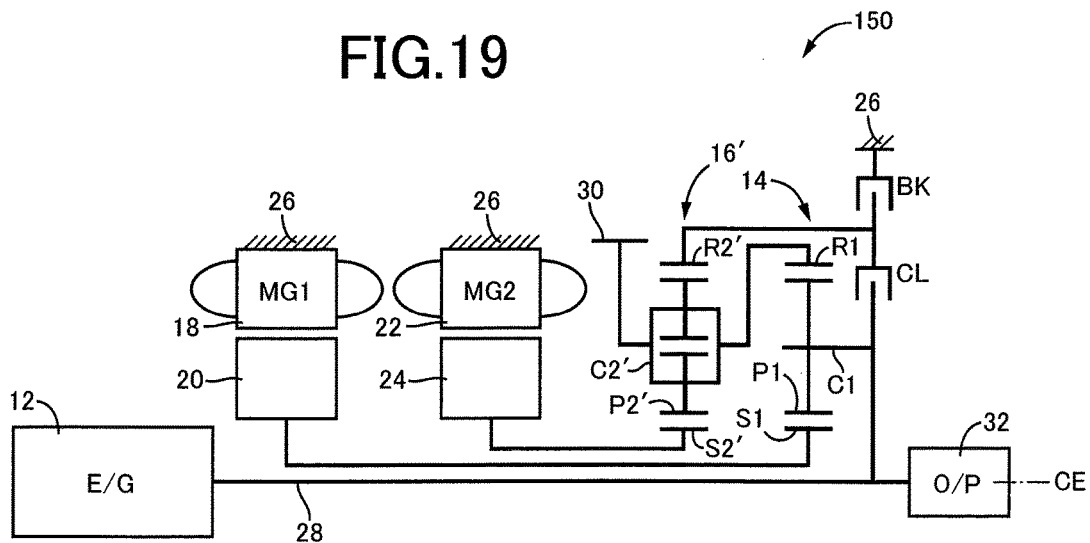
FIG. 19 is a schematic view for explaining an arrangement of a hybrid vehicle drive system according to yet another preferred embodiment of this invention.

FIG. 13 is the flow chart for explaining a major portion of an example of a substitutive drive control implemented by the electronic control device 40. The substitutive drive control is repeatedly implemented with a predetermined cycle time.

The substitutive drive control is initiated with step S1 ("step" being hereinafter omitted), to determine whether the first electric motor MG1 fails to operate. Then, the control flow goes to S2 to determine whether the second electric motor MG2 fails to operate. The control flow then goes to S3 to determine (detect) the electric energy amount stored in the battery 55, that is, the stored electric energy amount SOC. The control flow then goes to S4 to determine whether the first electric motor MG1 fails to operate (has an operational defect) while the second electric motor MG2 is free from a failure (is normally operable), on the basis of results of determinations in S1 and S2. If a negative determination is obtained in S4, the control flow goes to S13 and the following steps. If an affirmative determination is obtained in S4, the control flow goes to S5 to determine whether the stored electric energy amount SOC detected in S3 is smaller than the predetermined threshold value $SOC_{em}$. If an affirmative determination is obtained in S5, the control flow goes to S6 and the following steps. If a negative determination is obtained in S5, the control flow goes to S10 and the following steps.

S6 is implemented to command the indicator device 62 to provide the instructional information prompting the vehicle operator to stop the hybrid vehicle and park the hybrid vehicle on a turnout until the charging of the battery is completed. Then, the control flow goes to S7 to determine whether the hybrid vehicle has been brought to a stop, that is, the vehicle running speed V has been zeroed. If a negative determination is obtained in S7, the control flow goes back to S6. If an affirmative determination is obtained in S7, the control flow goes to S8 to place the clutch CL in the engaged state and place the brake BK in the released state. The control flow then goes to S9 to implement the battery charging control for charging the battery with the second electric motor MG2, that is, to operate the engine 12 to operate the second electric motor MG2 for generating an electric energy. After the battery 55 has been charged, the present routine is terminated. In S10, the indicator device 62 is commanded to provide the instructional information indicating permission of running of the vehicle in the substitutive drive mode. Then, the control flow goes to S11 to place the clutch CL in the released state and place the brake BK in the engaged state. The control flow then goes to S12 to implement the vehicle driving control for operating primarily the second electric motor MG2 to generate the vehicle drive force, and the present routine is terminated.

S13 is implemented to determine whether the first electric motor MG1 is free from a failure (is normally operable) while the second electric motor MG2 fails to operate (has an operational defect), on the basis of results of determinations in S1 and S2. If a negative determination is obtained in S13, the present routine is terminated. If an affirmative determination is obtained in S13, the control flow goes to S14 to determine whether the stored electric energy amount SOC detected in S3 is smaller than the predetermined threshold value $SOC_{em}$. If a negative determination is obtained in S14, the control flow goes to S18. If an affirmative determination is obtained in S14, the control flow goes to S15 to command the indicator device 62 to provide the instructional information prompting the vehicle operator to stop the hybrid vehicle and park the hybrid vehicle on a turnout until the charging of the battery is completed. Then, the control flow goes to S16 to determine whether the hybrid vehicle has been brought to a stop, that is, whether the vehicle running speed V has been zeroed. If a negative determination is obtained in S16, the control flow goes back to S15. If an affirmative determination is obtained in S16, the control flow then goes to S17 to implement the battery charging control for charging the battery with the first electric motor MG1, that is, to operate the engine 12 to operate the first electric motor MG1 for generating an electric energy, in the released states of the clutch CL and the brake BK. After the battery 55 has been charged, the present routine is terminated. S18 is implemented to command the indictor device 62 to provide the instructional information indicating permission of running of the vehicle in the substitutive drive mode. Then, the control flow goes to S19 to place both of the clutch CL and the brake BK in the engaged states. The control flow then goes to S20 to implement the vehicle driving control for operating primarily the first electric motor MG1 to generate the vehicle drive force, and the present routine is terminated.

Figure 21:
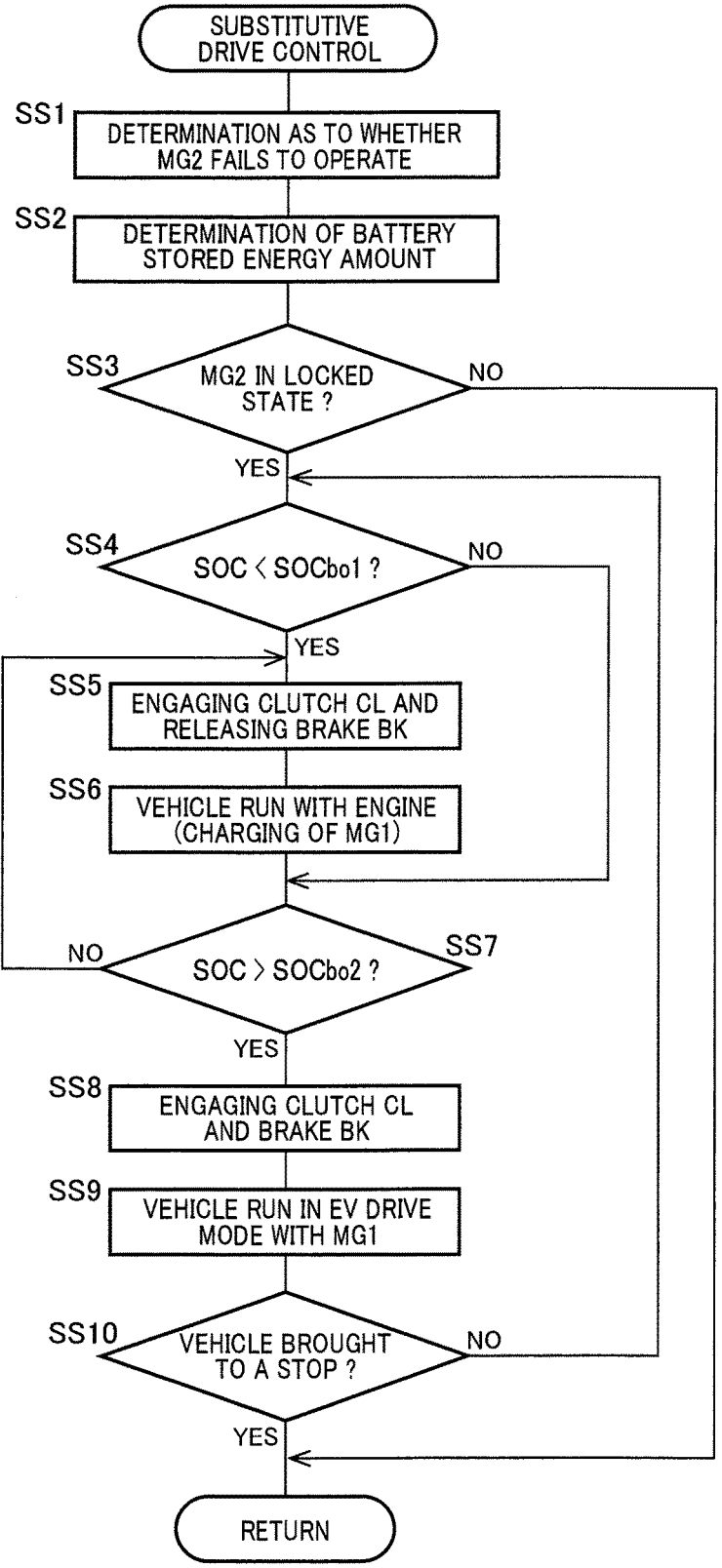
FIG. 21 is a flow chart for explaining a major portion of another example of the substitutive drive control implemented by the electronic control device of FIG. 2.

FIG. 21 is the flow chart for explaining a major portion of another example of the substitutive drive control implemented by the electronic control device 40. This substitutive drive control is repeatedly implemented with a predetermined cycle time.

The substitutive drive control is initiated with step SS1 to determine whether the second electric motor MG2 fails to operate. Then, the control flow goes to SS2 to determine (detect) the electric energy amount stored in the battery 55, that is, the stored electric energy amount SOC. The control flow then goes to SS3 to determine whether the second electric motor MG2 has a locking defect, namely, an operational failure caused by its seizure on the basis of result of determination in SS1. If a negative determination is obtained in SS3, the present routine is terminated. If an affirmative determination is obtained in SS3, the control flow goes to SS4 to determine whether the stored electric energy amount SOC detected in SS2 is smaller than the predetermined threshold value $SOC_{bo1}$ which is the output limit value of the battery. If a negative determination is obtained in SS4, the control flow goes to SS7. If an affirmative determination is obtained in SS4, the control flow goes to SS5 to place the clutch CL in the engaged state and place the brake BK in the releases state. The control flow then goes to SS6 to implement the HV drive control in which the engine 12 is operated to generate the vehicle drive force while the first electric motor MG1 is operated to generate an electric energy to charge the battery 55. Then, the control flow goes to SS7 to determine whether the stored electric energy amount SOC detected by the battery SOC sensor 54 is larger than the threshold value $SOC_{bo2}$ which is the input limit value of the battery. If a negative determination is obtained in SS7, the control flow goes back to SS5. If an affirmative determination is obtained in SS7, the control flow goes to SS8 to place both of the clutch CL and the brake BK in the engaged states. Then, the control flow goes to SS9 to implement the EV drive control in which the first electric motor MG1 is primarily operated to generate the vehicle drive force. The control flow then goes to SS10 to determine whether the hybrid vehicle has been brought to a stop, that is, whether the vehicle running speed V has been zeroed. If a negative determination is obtained in SS10, the control flow goes back to SS4. If an affirmative determination is obtained in SS10, the present routine is terminated.

It will be understood from the foregoing description by reference to FIGS. 13 and 21 that S9, S12, S17, S20 and SS9 correspond to the operation of the electric motor operation control portion 70, and S8, S11, S19, SS5 and SS8 correspond to the operations of the clutch engagement control portion 72 and the brake engagement control portion 74, and that S1 and S4 correspond to the operation of the MG failure determining portion 76, and S2, S13, SS1 and SS3 correspond to the operation of the MG2 failure determining portion 78, while S3, S5, S14, SS2, SS4 and SS7 correspond to the operation of the battery charge determining portion 80, and that S1-S20 and SS1-SS10 correspond to the operation of the substitutive drive control portion 82, and S6, S10, S15 and S18 correspond to the operation of the emergency indication control portion 84.

Other preferred embodiments of the present invention will be described in detail by reference to the drawings. In the following description, the same reference signs will be used to identify the same elements in the different embodiments, which will not be described redundantly.

Second Embodiment

Figure 20:
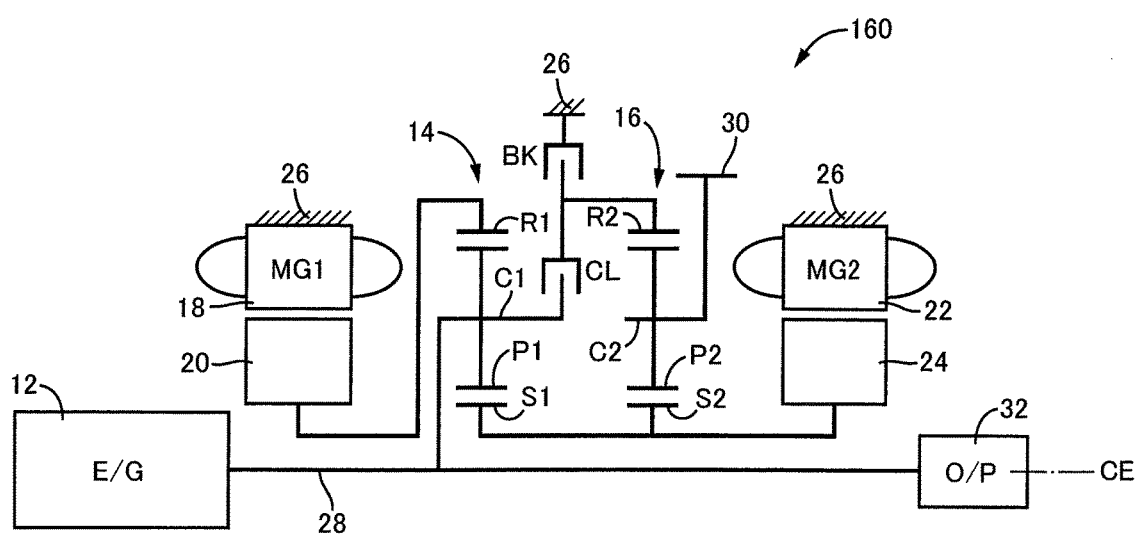
FIG. 20 is a schematic view for explaining an arrangement of a hybrid vehicle drive system according to a further preferred embodiment of this invention.

FIGS. 14-20 are the schematic views for explaining arrangements of respective hybrid vehicle drive systems 100, 110, 120, 130, 140, 150 and 160 according to other preferred modes of this invention. The hybrid vehicle drive control device of the present invention is also applicable to drive systems such as the drive system 100 shown in FIG. 14 and the drive system 110 shown in FIG. 15, which have respective different arrangements of the first electric motor MG1, first planetary gear set 14, second electric motor MG2, second planetary gear set 16, clutch CL and brake BK in the direction of the center axis CE. The present hybrid vehicle driving control device is also applicable to drive systems such as the drive system 120 shown in FIG. 16, which have a one-way clutch OWC disposed between the carrier C2 of the second planetary gear set 16 and the stationary member in the form of the housing 26, in parallel with the brake BK, such that the one-way clutch OWC permits a rotary motion of the carrier C2 relative to the housing 26 in one of opposite directions and inhibits a rotary motion of the carrier C2 in the other direction. The present hybrid vehicle drive control device is further applicable to drive systems such as the drive system 130 shown in FIG. 17, the drive system 140 shown in FIG. 18 and the drive system 150 shown in FIG. 19, which are provided with a second differential mechanism in the form of a second planetary gear set 16' of a double-pinion type, in place of the second planetary gear set 16 of a single-pinion type. This second planetary gear set 16' is provided with rotary elements (elements) consisting of a first rotary element in the form of a sun gear S2'; a second rotary element in the form of a carrier C2' supporting a plurality of pinion gears P2' meshing with each other such that each pinion gear P2' is rotatable about its axis and the axis of the planetary gear set; and a third rotary element in the form of a ring gear R2' meshing with the sun gear S2' through the pinion gears P2'. The hybrid vehicle drive control device of the present invention is also applicable to a drive system 160 as shown in FIG. 20, in which the sun gear S1 of the first planetary gear set 14 and the sun gear S2 of the second planetary gear set 16 are fixed to each other, and which is provided with the clutch CL for selectively connecting the carrier C1 of the first planetary gear set 14 and the ring gear R2 of the second planetary gear set 16 to each other, and the brake BK for selectively fixing the ring gear R2 to the housing 26, and wherein the ring gear R1 of the first planetary gear set 14 and the sun gear S2 of the second planetary gear set 16 (sun gear S1) are respectively connected to the first and second electric motors MG1 and MG2, and the carrier C2 of the second planetary gear set 16 is fixed to the output gear 30, while the carrier C1 of the first planetary gear set 14 is connected to the engine 12.

Figure 22:
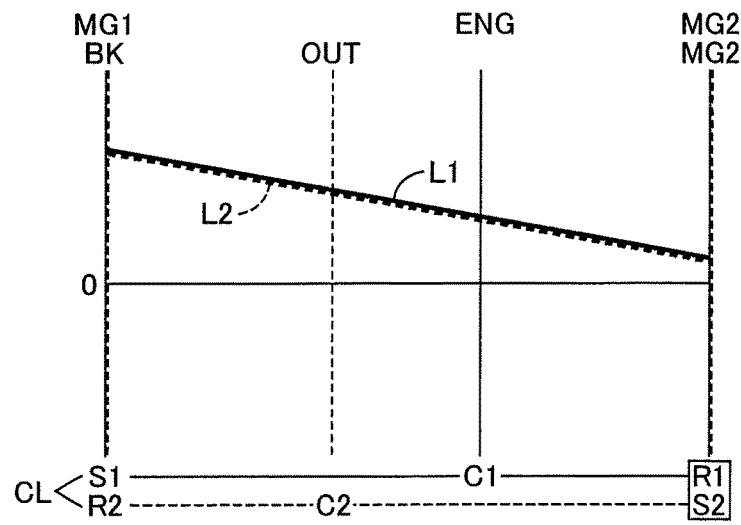
FIG. 22 is a collinear chart for explaining an arrangement and an operation of a hybrid vehicle drive system according to another preferred embodiment of this invention.
Figure 23:
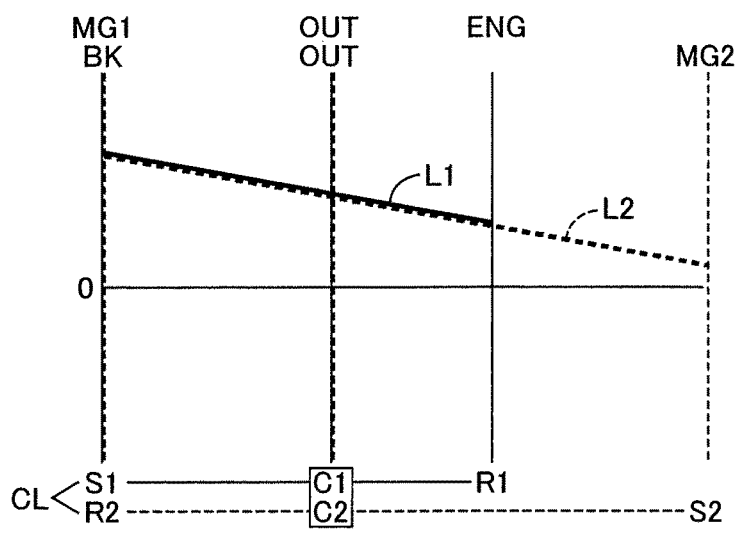
FIG. 23 is a collinear chart for explaining an arrangement and an operation of a hybrid vehicle drive system according to a further preferred embodiment of this invention.
Figure 24:
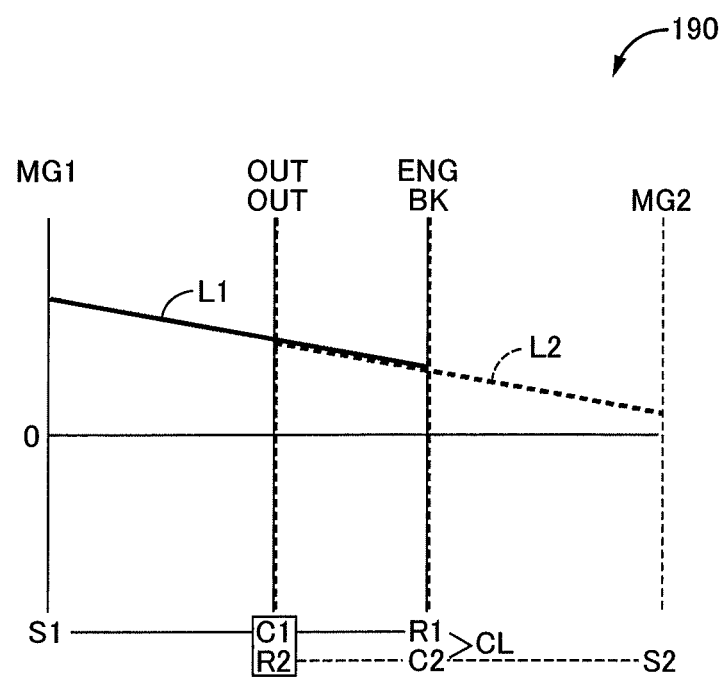
FIG. 24 is a collinear chart for explaining an arrangement and an operation of a hybrid vehicle drive system according to a still further preferred embodiment of this invention.

FIGS. 22-24 are the collinear charts for explaining arrangements and operations of respective hybrid vehicle drive systems 170, 180 and 190 according to other preferred embodiments of this invention in place of the drive system 10. In FIGS. 22-24, the relative rotating speeds of the sun gear S1, carrier C1 and ring gear R1 of the first planetary gear set 14 are represented by the solid line L1, while the relative rotating speeds of the sun gear S2, carrier C2 and ring gear R2 of the second planetary gear set 16 are represented by the broken line L2, as in FIGS. 4-7. In the drive system 170 for the hybrid vehicle shown in FIG. 22, the sun gear S1, carrier C1 and ring gear R1 of the first planetary gear set 14 are respectively connected to the first electric motor MG1, engine 12 and second electric motor MG2, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. The ring gear R1 and the sun gear S2 are connected to each other. In the drive system 180 for the hybrid vehicle shown in FIG. 23, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2 and output gear 30, and to the housing 26 through the brake BK. The sun gear S1 and the ring gear R2 are selectively connected to each other through the clutch CL. The carriers C1 and C2 are connected to each other. In the drive system 190 for the hybrid vehicle shown in FIG. 24, the sun gear S1, carrier C1 and ring gear R1 of the first planetary gear set 14 are respectively connected to the first electric motor MG1, output gear 30 and engine 12, while the sun gear S2, carrier C2 and ring gear R2 of the second planetary gear set 16 are respectively connected to the second electric motor MG2, to the housing 26 through the brake BK, and to the output gear 30. The ring gear R1 and the carrier C2 are selectively connected to each other through the clutch CL. The carrier C1 and ring gear R2 are connected to each other.

The drive systems for the hybrid vehicle shown in FIGS. 22-24 are identical with each other in that each of these drive systems for the hybrid vehicle is provided with the first differential mechanism in the form of the first planetary gear set 14 and the second differential mechanism in the form of the second planetary gear set 16, 16', which have four rotary elements (whose relative rotating speeds are represented) in the collinear chart, and is further provided with the first electric motor MG1, second electric motor MG2, engine 12 and output rotary member (output gear 30) which are connected to the respective four rotary elements, and wherein one of the four rotary elements is constituted by the rotary element of the first planetary gear set 14 and the rotary element of the second planetary gear set 16, 16' which are selectively connected to each other through the clutch CL, and the rotary element of the second planetary gear set 16, 16' selectively connected to the rotary element of the first planetary gear set 14 through the clutch CL is selectively fixed to the housing 26 as the stationary member through the brake BK, as in the drive system for the hybrid vehicle shown in FIGS. 4-7. Namely, the hybrid vehicle drive control device of the present invention described above by reference to FIG. 9 and the other figures is suitably applicable to the drive systems shown in FIGS. 22-24.

As described above, the illustrated embodiments are configured such that the hybrid vehicle is provided with: the first differential mechanism in the form of the first planetary gear set 14 and the second differential mechanism in the form of the second planetary gear set 16, 16' which have the four rotary elements as a whole when the clutch CL is placed in the engaged state (and thus the first planetary gear set 14 and the second planetary gear set 16, 16' are represented as the four rotary elements in the collinear charts such as FIGS. 4-7); and the engine 12, the first electric motor MG1, the second electric motor MG2 and the output rotary member in the form of the output gear 30 which are respectively connected to the four rotary elements. One of the four rotary elements is constituted by the rotary element of the above-described first differential mechanism and the rotary element of the above-described second differential mechanism which are selectively connected to each other through the clutch CL, and one of the rotary elements of the first and second differential mechanisms which are selectively connected to each other through the clutch CL is selectively fixed to the stationary member in the form of the housing 26 through the brake BK. The hybrid vehicle is selectively placed in the plurality of drive modes according to the respective combi-nations of the engaged and released states of the clutch CL and brake BK. The drive control device is configured to alternately implement the vehicle driving and battery charging controls in the event of a failure of one of the first and second electric motors MG1 and MG2, the vehicle driving control being implemented to operate the other of the first and second electric motors MG1 and MG2, for generating the vehicle drive force, and the battery charging control being implemented to charge the vehicle driving battery 55 with the other electric motor. Accordingly, not only the hybrid vehicle can be run with a sufficient drive force, but also the vehicle driving battery 55 can be charged with a sufficient amount of electric energy even in the event of a failure of one of the first and second electric motors. Namely, the illustrated embodiments provide a drive control device in the form of the electronic control device 40 for a hybrid vehicle, which permits the hybrid vehicle to be run in an adequate substitutive drive mode in the event of a failure of an electric motor.

The drive system 10 and the other drive systems described above do not permit the first planetary gear set 14 or the second planetary gear set 16 to sufficiently boost torque of the engine 12. Depending upon the type of failure of the electric motor, the non-failing electric motor MG should receive a reaction force, to transmit the torque of the engine 12 directly to the output gear 30. Therefore, the drive system cannot use a sum of torque of the non-failing electric motor MG and the torque of the engine 12, as the vehicle drive force. Where the amount of charging of the battery 55 is limited, the engine 12 cannot be operated to provide a large output. Accordingly, the prior art substitutive drive control implemented in the event of a failure of one of the electric motors suffers from insufficiency of the vehicle drive force, giving rise to a risk of delayed starting of the vehicle or difficulty of running of the vehicle on an uphill road. On the other hand, the substitutive drive control according to the illustrated embodiments effectively solves this drawback.

The drive control device is configured to switch the vehicle driving and the above-described battery charging control from one to the other, depending upon the electric energy amount SOC stored in the battery 55. Accordingly, the vehicle driving control to generate the vehicle drive force with the above-indicated other electric motor MG, and the battery charging control to charge the vehicle driving battery 55 with this other electric motor MG can be switched from one to the other in a highly practical manner.

The drive control device is configured to implement the battery charging control with the engine 12 and the second electric motor MG2 in the engaged state of the clutch CL and in the released state of the brake BK, where the electric energy amount stored in the battery 55 is smaller than the predetermined threshold value $SOC_{em}$, in the event of the failure of the first electric motor MG1. Accordingly, the battery 55 can be suitably charged in a highly practical manner where the electric energy amount stored in the battery 55 is insufficient in the event of the failure of the first electric motor MG1.

The drive control device is configured to implement the vehicle driving control to operate the second electric motor MG2 to generate the vehicle drive force in the released state of the clutch CL and in the engaged state of the brake BK, where the electric energy amount stored in the battery 55 is equal to or larger than the predetermined threshold value $SOC_{em}$, in the event of the failure of the first electric motor MG1. Accordingly, a sufficient vehicle drive force can be obtained in a highly practical manner in the substitutive drive mode in the event of the failure of the first electric motor MG1.

The drive control device is configured to implement the battery charging control with the engine 12 and the first electric motor MG1 in the released states of both of the clutch CL and the brake BK, where the electric energy amount stored in the battery 55 is smaller than the predetermined threshold value $SOC_{em}$, in the event of the failure of the second electric motor MG2. Accordingly, the battery 55 can be suitably charged in a highly practical manner where the electric energy amount stored in the battery 55 is insufficient in the event of the failure of the second electric motor MG2.

The drive control device is configured to implement the vehicle driving control to operate the first electric motor MG1 to generate the vehicle drive force in the engaged states of both of the clutch CL and the brake BK, where the electric energy amount stored in the battery 55 is equal to or larger than the predetermined threshold value $SOC_{em}$, in the event of the failure of the second electric motor MG2. Accordingly, a sufficient vehicle drive force can be obtained in a highly practical manner in the substitutive drive mode in the event of the failure of the second electric motor MG2.

The drive control device is configured to command the indicator device 62 to provide instructional information relating to the vehicle driving control and the battery charging control, in the event of the failure of the first electric motor MG1 or the second electric motor MG2. Accordingly, the vehicle operator is provided with adequate instructions as to a manner of manipulation of the hybrid vehicle that should be conducted by the operator in the event of the failure of the first electric motor MG1 or the second electric motor MG2.

The drive control device is configured to command the indicator device 62 to provide the instructional information prompting the vehicle operator to stop the hybrid vehicle and park the hybrid vehicle in a turnout until the charging of the battery is completed, when the battery charging control is implemented to charge the battery. Accordingly, the vehicle operator is provided with adequate instructions as to a manner of manipulation of the hybrid vehicle that should be conducted by the operator when the electric energy amount stored in the battery 55 is insufficient, in the event of the failure of the first or second electric motor MG1 or MG2.

The drive control device is configured to command the indicator device 62 to provide the instructional information indicating that the hybrid vehicle can be run, when the vehicle driving control is implemented. Accordingly, the operator of the hybrid vehicle is provided with adequate instructions indicating that the vehicle can be run in an adequate substitutive drive mode, in the event of a failure of the first electric motor MG1 or the second electric motor MG2.

The first planetary gear set 14 is provided with a first rotary element in the form of the sun gear S1 connected to the first electric motor MG1, a second rotary element in the form of the carrier C1 connected to the engine 12, and a third rotary element in the form of the ring gear R1 connected to the output gear 30, while the second planetary gear set 16 (16') is provided with a first rotary element in the form of the sun gear S2 (S2') connected to the second electric motor MG2, a second rotary element in the form of the carrier C2 (C2'), and a third rotary element in the form of the ring gear R2 (R2'), one of the carrier C2 (C2') and the ring gear R2 (R2') being connected to the ring gear R1 of the first planetary gear set 14. The clutch CL is configured to selectively connect the carrier C1 of the first planetary gear set 14 and the other of the carrier C2 (C2') and the ring gear R2 (R2') which is not connected to the ring gear R1, to each other, while the brake BK is configured to selectively fix the other of the carrier C2 (C2') and the ring gear R2 (R2') which is not connected to the ring gear R1, to a stationary member in the form of the housing 26 Accordingly, the hybrid vehicle the drive system 10 of which has a highly practically arrangement can be run in an adequate substitutive drive mode in the event of a failure of an electric motor.

While the preferred embodiments of this invention have been described by reference to the drawings, it is to be understood that the invention is not limited to the details of the illustrated embodiments, but may be embodied with various changes which may occur without departing from the spirit of the invention.

NOMENCLATURE OF REFERENCE SIGNS 10, 100, 110, 120, 130, 140, 150, 160, 170, 180, 190: Hybrid vehicle drive system
12: Engine 14: First planetary gear set (First differential mechanism)
16, 16': Second planetary gear set (Second differential mechanism)
18, 22: Stator 20, 24: Rotor 26: Housing (Stationary member)
28: Input shaft 30: Output gear (Output rotary member)
32: Oil pump 40: Electronic control device (Drive control device)
42: Accelerator pedal operation amount sensor 44: Engine speed sensor
46: MG1 speed sensor 48: MG2 speed sensor 50: Output speed sensor
52: Wheel speed sensors 54: Battery SOC sensor 55: Battery (Vehicle driving battery)
56: Engine control device 58: Inverter 60: Hydraulic control unit
62: Indicator device 70: Electric motor operation control portion
72: Clutch engagement control portion
74: Brake engagement control portion
76: MG1 failure determining portion 78: MG2 failure determining portion
80: Battery charge determining portion
82: Substitutive drive control portion
84: Emergency indication control portion
BK: Brake CL: Clutch C1, C2, C2': Carrier (Rotary element)
MG1: First electric motor MG2: Second electric motor
OWC: One-way clutch P1, P2, P2': Pinion gear
R1, R2, R2': Ring gear (Rotary element)
S1, S2, S2': Sun gear (Rotary element)

The invention claimed is:

1. A drive control device for a hybrid vehicle provided with: a differential device which includes a first differential mechanism and a second differential mechanism and which has four rotary elements; and an engine, a first electric motor, a second electric motor and an output rotary member which are respectively connected to said four rotary elements, and wherein one of said four rotary elements is constituted by a rotary component of said first differential mechanism and a rotary component of said second differential mechanism which are selectively connected to each other through a clutch, and one of the rotary components of said first and second differential mechanisms which are selectively connected to each other through said clutch is selectively fixed to a stationary member through a brake, said hybrid vehicle being selectively placed in a plurality of drive modes according to respective combinations of engaged and released states of said clutch and said brake, said drive control device comprising:
- a substitutive drive control portion configured to alternately implement a vehicle driving control and a battery charging control in each of the event of a failure of said first electric motor and the event of a failure of said second electric motor, wherein:
- said vehicle driving control is implemented to stop the engine and operate only one of said first and second electric motors, which is not failed, for generating a vehicle drive force, when an electric energy amount stored in a vehicle driving battery is equal to or larger than a predetermined threshold value; and
- said battery charging control is implemented to stop the hybrid vehicle, operate the engine, and charge the vehicle driving battery with the engine and one of the first and second electric motors when the electric energy amount stored in the vehicle driving battery is smaller than the predetermined threshold value.

2. The drive control device according to claim 1, wherein said substitutive drive control portion implements said battery charging control with said engine and said second electric motor in the engaged state of said clutch and in the released state of said brake, where the electric energy amount stored in said vehicle driving battery is smaller than the predetermined threshold value, in the event of the failure of said first electric motor.

3. The drive control device according to claim 1, wherein said substitutive drive control portion implements said vehicle driving control to operate said second electric motor to generate the vehicle drive force in the released state of said clutch and in the engaged state of said brake, where the electric energy amount stored in said vehicle driving battery is equal to or larger than the predetermined threshold value, in the event of the failure of said first electric motor.

4. The drive control device according to claim 1, wherein said substitutive drive control portion implements said battery charging control with said engine and said first electric motor, in the released states of both of said clutch and said brake, where the electric energy amount stored in said vehicle driving battery is smaller than the predetermined threshold value, in the event of the failure of said second electric motor.

5. The drive control device according to claim 1, wherein said substitutive drive control portion implements said vehicle driving control to operate said first electric motor to generate the vehicle drive force in the engaged states of both of said clutch and said brake, where the electric energy amount stored in said vehicle driving battery is equal to or larger than the predetermined threshold value, in the event of the failure of said second electric motor.

6. The drive control device according to claim 1, further comprising an emergency indication control portion configured to command an indicator device disposed within the hybrid vehicle, to provide instructional information relating to said vehicle driving control and said battery charging control, in the event of the failure of said first electric motor or said second electric motor.

7. The drive control device according to claim 6, wherein said emergency indication control portion commands said indicator device to provide the instructional information prompting an operator of the hybrid vehicle to stop the hybrid vehicle and park the hybrid vehicle in a turnout until the charging of said battery is completed, when said battery charging control is implemented to charge the battery.

8. The drive control device according to claim 6, wherein said emergency indication control portion commands said indicator device to provide the instructional information indicating that the hybrid vehicle can be run, when said vehicle driving control is implemented.

9. The drive control device according to claim 1, wherein said first differential mechanism is provided with a first rotary element connected to said first electric motor, a second rotary element connected to said engine, and a third rotary element connected to said output rotary member, while said second differential mechanism is provided with a first rotary element connected to said second electric motor, a second rotary element, and a third rotary element, one of the second and third rotary elements of the second differential mechanism being connected to the third rotary element of said first differential mechanism,
- and wherein said clutch is configured to selectively connect the second rotary element of said first differential mechanism, and the other of the second and third rotary elements of said second differential mechanism which is not connected to the third rotary element of said first differential mechanism, to each other, while said brake is configured to selectively fix the other of the second and third rotary elements of said second differential mechanism which is not connected to the third rotary element of said first differential mechanism, to the stationary member.

* * * * *